US011016198B2

(12) United States Patent
Barnes

(10) Patent No.: US 11,016,198 B2
(45) Date of Patent: May 25, 2021

(54) BROADCAST TRANSMISSION OF INFORMATION INDICATIVE OF A PSEUDORANGE CORRECTION

(71) Applicant: HERE Global B.V., LB Veldhoven (NL)

(72) Inventor: Craig Barnes, Forest Park, IL (US)

(73) Assignee: HERE Global B.V., Eindhoven (NL)

( * ) Notice: Subject to any disclaimer, the term of this patent is extended or adjusted under 35 U.S.C. 154(b) by 816 days.

(21) Appl. No.: 14/705,697

(22) Filed: May 6, 2015

(65) Prior Publication Data

US 2016/0327650 A1 Nov. 10, 2016

(51) Int. Cl.
*G01S 19/07* (2010.01)
*G01S 19/11* (2010.01)
(Continued)

(52) U.S. Cl.
CPC ............ *G01S 19/071* (2019.08); *G01S 19/07* (2013.01); *G01S 19/11* (2013.01); *G01S 19/25* (2013.01);
(Continued)

(58) Field of Classification Search
CPC ...................................................... G01S 19/45
(Continued)

(56) References Cited

U.S. PATENT DOCUMENTS

| 5,523,763 A * | 6/1996 | Loomis | G01S 19/07 342/357.44 |
| 7,400,294 B2 * | 7/2008 | Whitehead | G01S 19/07 342/357.24 |

(Continued)

FOREIGN PATENT DOCUMENTS

WO WO0163314 A1 8/2001

OTHER PUBLICATIONS

PCT International Search Report and Written Opinion of the International Searching Authority dated Jul. 19, 2016 for corresponding PCT/EP2016/060132.
(Continued)

*Primary Examiner* — Erin F Heard
*Assistant Examiner* — Helena H Seraydaryan
(74) *Attorney, Agent, or Firm* — Lempia Summerfield Katz LLC

(57) ABSTRACT

A method comprising receiving, by an apparatus, global-positioning-system data from a plurality of global-positioning-system satellites, determining a measured satellite pseudorange for each global-positioning-system satellite of the plurality of global-positioning-system satellites based, at least in part, on the global-positioning-system data, receiving, by the apparatus, of non-global-positioning-system data from at least one sensor, determining an apparatus position of the apparatus based, at least in part, on the non-global-positioning-system data, the determination of the apparatus position being absent consideration of any global-positioning-system data, determining at least one pseudorange correction associated with at least one global-positioning-system satellite of the plurality of global-positioning-system satellites based, at least in part, on the measured satellite pseudorange and the apparatus position, and causing broadcast transmission of information indicative of the pseudorange correction is disclosed.

14 Claims, 15 Drawing Sheets

(51) Int. Cl.
*G01S 19/25* (2010.01)
*G01S 19/45* (2010.01)
*H04B 7/185* (2006.01)
*H04H 20/02* (2008.01)
*G01S 19/48* (2010.01)
*G01S 19/49* (2010.01)

(52) U.S. Cl.
CPC .......... *G01S 19/45* (2013.01); *H04B 7/18523* (2013.01); *H04H 20/02* (2013.01); *G01S 19/48* (2013.01); *G01S 19/49* (2013.01)

(58) Field of Classification Search
USPC ..................................................... 342/357.44
See application file for complete search history.

(56) References Cited

U.S. PATENT DOCUMENTS

| | | | | |
|---|---|---|---|---|
| 8,831,633 | B2* | 9/2014 | Moshfeghi | G01S 19/48 455/456.1 |
| 2004/0083043 | A1* | 4/2004 | Akiyama | B60G 17/0195 701/48 |
| 2006/0087474 | A1* | 4/2006 | Do | G01S 1/7034 342/386 |
| 2006/0253226 | A1* | 11/2006 | Mendelson | H04B 7/24 701/1 |
| 2008/0137715 | A1* | 6/2008 | Fitzgibbon | H04B 1/202 375/131 |
| 2012/0089319 | A1 | 4/2012 | Basnayake | |
| 2012/0101763 | A1 | 4/2012 | Sambongi | |
| 2012/0249368 | A1* | 10/2012 | Youssef | G01S 19/26 342/357.31 |
| 2013/0027222 | A1* | 1/2013 | Kosai | G08G 1/163 340/902 |
| 2013/0116908 | A1 | 5/2013 | Oh et al. | |
| 2013/0282277 | A1 | 10/2013 | Rubin et al. | |
| 2014/0187193 | A1* | 7/2014 | Rudow | H04M 3/42348 455/404.2 |
| 2016/0042239 | A1* | 2/2016 | Fowe | G06T 7/20 382/104 |

OTHER PUBLICATIONS

Yuta et al., "A Method for Pedestrian Position Estimation Using Inter-Vehicle Communication", http://ito-lab.naist.jp/themes/ITS/pdfs/2-1/1.pdf, 2008.

Drawil, "Intervehicle-Communication Assisted Localization", May 17, 2010, pp. 678-691.

* cited by examiner

BROADCAST TRANSMISSION OF INFORMATION INDICATIVE OF A PSEUDORANGE CORRECTION

TECHNICAL FIELD

The present application relates generally to broadcast transmission of information indicative of a pseudorange correction.

BACKGROUND

Over the years, society has become increasingly reliant upon electronic apparatuses. For example, many individuals utilize their electronic apparatuses for purposes relating to mapping, navigation, routing, and/or the like. Additionally, modern advances in assisted-driving automobiles and self-driving automobiles have necessitated a high degree of accuracy regarding the position of such automobiles. As such, it may be desirable to configure an apparatus such that the apparatus may facilitate such functionality.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for receiving, by an apparatus, global-positioning-system data from a plurality of global-positioning-system satellites, determining a measured satellite pseudorange for each global-positioning-system satellite of the plurality of global-positioning-system satellites based, at least in part, on the global-positioning-system data, receiving, by the apparatus, of non-global-positioning-system data from at least one sensor, determining an apparatus position of the apparatus based, at least in part, on the non-global-positioning-system data, the determination of the apparatus position being absent consideration of any global-positioning-system data, determining at least one pseudorange correction associated with at least one global-positioning-system satellite of the plurality of global-positioning-system satellites based, at least in part, on the measured satellite pseudorange and the apparatus position, and causing broadcast transmission of information indicative of the pseudorange correction.

One or more example embodiments may provide an apparatus, a computer readable medium, a computer program product, and/or a non-transitory computer readable medium having means for receiving, by an apparatus, global-positioning-system data from a plurality of global-positioning-system satellites, means for determining a measured satellite pseudorange for each global-positioning-system satellite of the plurality of global-positioning-system satellites based, at least in part, on the global-positioning-system data, means for receiving, by the apparatus, of non-global-positioning-system data from at least one sensor, means for determining an apparatus position of the apparatus based, at least in part, on the non-global-positioning-system data, the determination of the apparatus position being absent consideration of any global-positioning-system data, means for determining at least one pseudorange correction associated with at least one global-positioning-system satellite of the plurality of global-positioning-system satellites based, at least in part, on the measured satellite pseudorange and the apparatus position, and means for causing broadcast transmission of information indicative of the pseudorange correction.

In at least one example embodiment, the causation of broadcast transmission of information indicative of the pseudorange correction comprises causation of broadcast transmission of information indicative of the pseudorange correction and information indicative of the global-positioning-system satellite associated with the pseudorange correction.

In at least one example embodiment, the measured satellite pseudorange for a particular global-positioning-system satellite of the plurality of global-positioning-system satellites is a calculated distance between the particular global-positioning-system satellite and the apparatus.

One or more example embodiments further perform determination of an actual pseudorange for each global-positioning-system satellite of the plurality of global-positioning-system satellites based, at least in part, on the apparatus position.

In at least one example embodiment, the determination of the pseudorange correction is based, at least in part, on a difference between the measured satellite pseudorange and the actual pseudorange.

In at least one example embodiment, the non-global-positioning-system data is highly assisted driving data, and the at least one sensor is a highly assisted driving sensor.

One or more example embodiments further perform receipt, by the apparatus, of different global-positioning-system data from the plurality of global-positioning-system satellites, determination of a different measured satellite pseudorange for each global-positioning-system satellite of the plurality of global-positioning-system satellites based, at least in part, on the different global-positioning-system data, receipt, by the apparatus, of different non-global-positioning-system data from at least one sensor, and determination of a different apparatus position of the apparatus based, at least in part, on the different non-global-positioning-system data, the determination of the different apparatus position being absent consideration of any global-positioning-system data.

One or more example embodiments further perform determination of at least one different pseudorange correction associated with at least one global-positioning-system satellite of the plurality of global-positioning-system satellites based, at least in part, on the different measured satellite pseudorange and the different apparatus position, and causation of broadcast transmission of information indicative of the different pseudorange correction.

In at least one example embodiment, the causation of broadcast transmission of information indicative of the different pseudorange correction comprises causation of broadcast transmission of information indicative of the different pseudorange correction and information indicative of the global-positioning-system satellite associated with the different pseudorange correction.

One or more example embodiments further perform determination that the apparatus is in motion based, at least in part, on the apparatus position and the different apparatus position.

One or more example embodiments further perform causation of termination of broadcast transmission of information indicative of the pseudorange correction based, at least in part, on the determination that the apparatus is in motion.

One or more example embodiments further perform receipt of information that identifies a separate apparatus as a broadcast apparatus candidate, and causation of sending of a broadcast directive to the separate apparatus, the broadcast directive being configured to cause the separate apparatus to initiate broadcast transmission of information indicative of at least another pseudorange correction, the causation of sending of the broadcast directive to the separate apparatus being based, at least in part, on the determination that the apparatus is in motion.

In at least one example embodiment, the causation of sending of the broadcast directive to the separate apparatus comprises causation of broadcast transmission of information indicative of the broadcast directive, the broadcast directive identifying the separate apparatus.

In at least one example embodiment, the determination that the apparatus is in motion comprises determination that the apparatus vacated a parking space, the information that identifies the separate apparatus as the broadcast apparatus candidate indicates that the separate apparatus is positioned in a different parking space, and the causation of sending of the broadcast directive to the separate apparatus is based, at least in part, on the determination that the apparatus vacated the parking space and the separate apparatus being positioned within the different parking space.

In at least one example embodiment, the determination that the apparatus is in motion comprises determination that the apparatus vacated a parking space.

One or more example embodiments further perform receipt of a broadcast directive from a separate apparatus.

In at least one example embodiment, the determination of the apparatus position of the apparatus is based, at least in part, on the receipt of the broadcast directive.

One or more example embodiments further perform receipt of a broadcast directive from a separate apparatus.

In at least one example embodiment, the determination of the pseudorange correction associated with the global-positioning-system satellite is based, at least in part, on the receipt of the broadcast directive.

One or more example embodiments further perform receipt of a broadcast directive from a separate apparatus.

In at least one example embodiment, the causation of broadcast transmission of information indicative of the pseudorange correction is based, at least in part, on the receipt of the broadcast directive.

One or more example embodiments further perform receipt of information indicative of a broadcast enablement input.

In at least one example embodiment, the determination of the apparatus position of the apparatus is based, at least in part, on the broadcast enablement input.

One or more example embodiments further perform receipt of information indicative of a broadcast enablement input.

In at least one example embodiment, the determination of the pseudorange correction associated with the global-positioning-system satellite is based, at least in part, on the broadcast enablement input.

One or more example embodiments further perform receipt of information indicative of a broadcast enablement input.

In at least one example embodiment, the causation of broadcast transmission of information indicative of the pseudorange correction is based, at least in part, on the broadcast enablement input.

One or more example embodiments further perform determination that the pseudorange correction associated with the global-positioning-system satellite exceeds a pseudorange correction threshold.

In at least one example embodiment, the causation of broadcast transmission of information indicative of the pseudorange correction is predicated by the determination that the pseudorange correction associated with the global-positioning-system satellite exceeds the pseudorange correction threshold.

In at least one example embodiment, the pseudorange correction threshold indicates a pseudorange correction beyond which the apparatus causes broadcast transmission of information indicative of the pseudorange correction.

One or more example embodiments further perform receipt of information that identifies a separate apparatus as a broadcast apparatus candidate, determination that at least one broadcast hand-off condition has been satisfied, and causation of sending of a broadcast directive to the separate apparatus, the broadcast directive being configured to cause the separate apparatus to initiate broadcast transmission of information indicative of at least another pseudorange correction, the causation of sending of the broadcast directive to the separate apparatus being based, at least in part, on the determination that the broadcast hand-off condition has been satisfied.

One or more example embodiments further perform causation of termination of broadcast transmission of information indicative of the pseudorange correction based, at least in part, on the determination that the broadcast hand-off condition has been satisfied.

One or more example embodiments further perform receipt of information that identifies another separate apparatus as another broadcast apparatus candidate, and determination that the separate apparatus is more favorable for causation of initiation of broadcast transmission of information indicative of the other pseudorange correction than the other separate apparatus.

In at least one example embodiment, the causation of sending of the broadcast directive to the separate apparatus is based, at least in part, on the determination that the separate apparatus is more favorable for causation of initiation of broadcast transmission of information indicative of the other pseudorange correction than the other separate apparatus.

One or more example embodiments further perform receipt of information indicative of a battery level associated with the apparatus.

In at least one example embodiment, the broadcast hand-off condition indicates a battery level threshold, and the determination that the broadcast hand-off condition has been satisfied comprises determination that the battery level is less than the battery level threshold.

BRIEF DESCRIPTION OF THE DRAWINGS

For a more complete understanding of one or more example embodiments, reference is now made to the following descriptions taken in connection with the accompanying drawings in which.

DETAILED DESCRIPTION OF THE DRAWINGS

Figure 1:
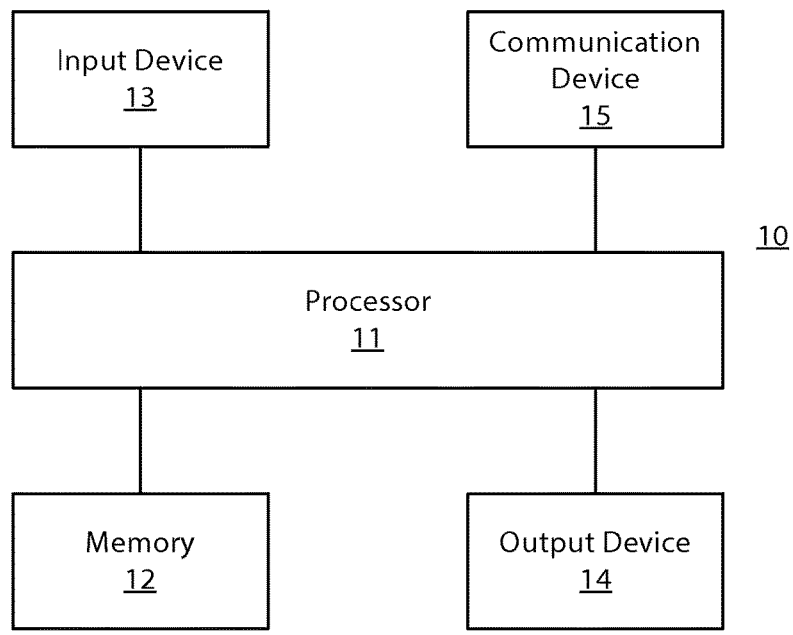
FIG. 1 is a block diagram showing an apparatus according to at least one example embodiment.

Various example embodiments and some of their potential advantages are understood by referring to FIGS. 1 through 12 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, an infotainment system, a navigation system, an electronic automobile component, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

Figure 2A:
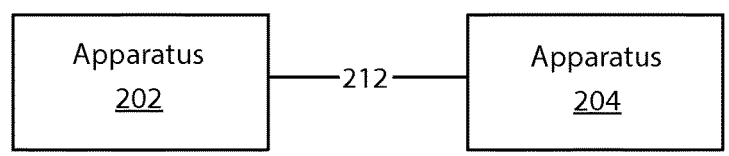
FIGS. 2A-2B are block diagrams showing apparatus communication according to at least one example embodiment.
Figure 2B:
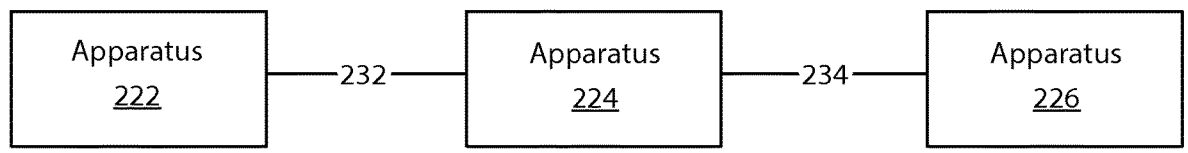

FIGS. 2A-2B are diagrams illustrating apparatus communication according to at least one example embodiment. The example of FIGS. 2A-2B are merely examples and do not limit the scope of the claims. For example, apparatus count may vary, apparatus configuration may vary, communication channels may vary, and/or the like.

In the example of FIG. 2A, apparatus 202 communicates with apparatus 204 by way of communication channel 212. For example, apparatus 202 may send information to apparatus 204 by way of communication channel 212, apparatus 202 may receive information sent from apparatus 204 by way of communication channel 212, and/or the like. A communication channel, for example, may be a channel utilized for sending and/or receiving of information, data, communications, and/or the like, between two or more apparatuses. It should be understood that, even though the example of FIG. 2A illustrates a direct communication channel between apparatus 202 and apparatus 204, there may be intermediate apparatuses that facilitate communication between apparatus 202 and apparatus 204. For example, there may be one or more routers, hubs, switches, gateways, and/or the like, that are utilized in the communication channels between apparatus 202 and apparatus 204. In addition, there may be other separate apparatuses that apparatus 202 and/or apparatus 204 are in communication with. For example, apparatus 202 and/or apparatus 204 may be in communication with another apparatus, a separate apparatus, a different apparatus, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2A, apparatus 202 communicates with apparatus 204 by way of a communication channel 212. In the example of FIG. 2A, communication channel 212 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2A, apparatus 202 communicates with apparatus 204 by way of communication channel 212. In the example of FIG. 2A, communication channel 212 may be a local area network communication channel, a wide area network communication channel, an internet communication channel, a cellular communication channel, and/or the like.

In the example of FIG. 2B, apparatus 222 communicates with apparatus 224 by way of communication channel 232. For example, apparatus 222 may send information to apparatus 224 by way of communication channel 232, apparatus 222 may receive information sent from apparatus 224 by way of communication channel 232, and/or the like. A communication channel, for example, may be a channel utilized for sending and/or receiving of information, data, communications, and/or the like, between two or more apparatuses. It should be understood that, even though the example of FIG. 2B illustrates a direct communication channel between apparatus 222 and apparatus 224, there may be intermediate apparatuses that facilitate communication between apparatus 222 and apparatus 224. For example, there may be one or more routers, hubs, switches, gateways, and/or the like, that are utilized in the communication channels between apparatus 222 and apparatus 224. In addition, there may be other separate apparatuses that apparatus 222 and/or apparatus 224 are in communication with. For example, apparatus 222 and/or apparatus 224 may be in communication with another apparatus, a separate apparatus, a different apparatus, and/or the like.

In the example of FIG. 2B, apparatus 226 communicates with apparatus 224 by way of communication channel 234. For example, apparatus 226 may send information to apparatus 224 by way of communication channel 234, apparatus 226 may receive information sent from apparatus 224 by way of communication channel 234, and/or the like. It should be understood that, even though the example of FIG. 2B illustrates a direct communication channel between apparatus 226 and apparatus 224, there may be intermediate apparatuses that facilitate communication between apparatus 226 and apparatus 224. For example, there may be one or more routers, hubs, switches, gateways, and/or the like, that are utilized in the communication channels between apparatus 226 and apparatus 224. In addition, there may be other separate apparatuses that apparatus 226 and/or apparatus 224 are in communication with. For example, apparatus 226 and/or apparatus 224 may be in communication with another apparatus, a separate apparatus, a different apparatus, and/or the like. In this manner, apparatus 222 may be in communication with apparatus 226 by way of apparatus 224. For example, apparatus 226 may send information to apparatus 224, and apparatus 224 may subsequently send the information to apparatus 222.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based, at least in part, on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, local port communication, input/output port communication, and/or the like, the apparatuses may be considered to be proximate with each other based, at least in part, on availability of such proximity-based communication with each other. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example, the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform. For example, the apparatus may be privileged to access specific information that may be stored on the separate apparatus, cause the apparatus to perform one or more operations in response to a directive communicated to the separate apparatus, and/or the like.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, local port communication, input/output port communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2B, apparatus 222 communicates with apparatus 224 by way of a communication channel 232. In the example of FIG. 2B, communication channel 232 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. In another example, as depicted in FIG. 2B, apparatus 226 communicates with apparatus 224 by way of a communication channel 234. In the example of FIG. 2B, communication channel 234 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2B, apparatus 222 communicates with apparatus 224 by way of communication channel 232. In the example of FIG. 2B, communication channel 232 may be a local area network communication channel, a wide area network communication channel, an internet communication channel, a cellular communication channel, and/or the like. Similarly, as depicted in FIG. 2B, apparatus 226 communicates with apparatus 224 by way of communication channel 234. In the example of FIG. 2B, communication channel 234 may be a local area network communication channel, a wide area network communication channel, an internet communication channel, a cellular communication channel, and/or the like.

Figure 3A:
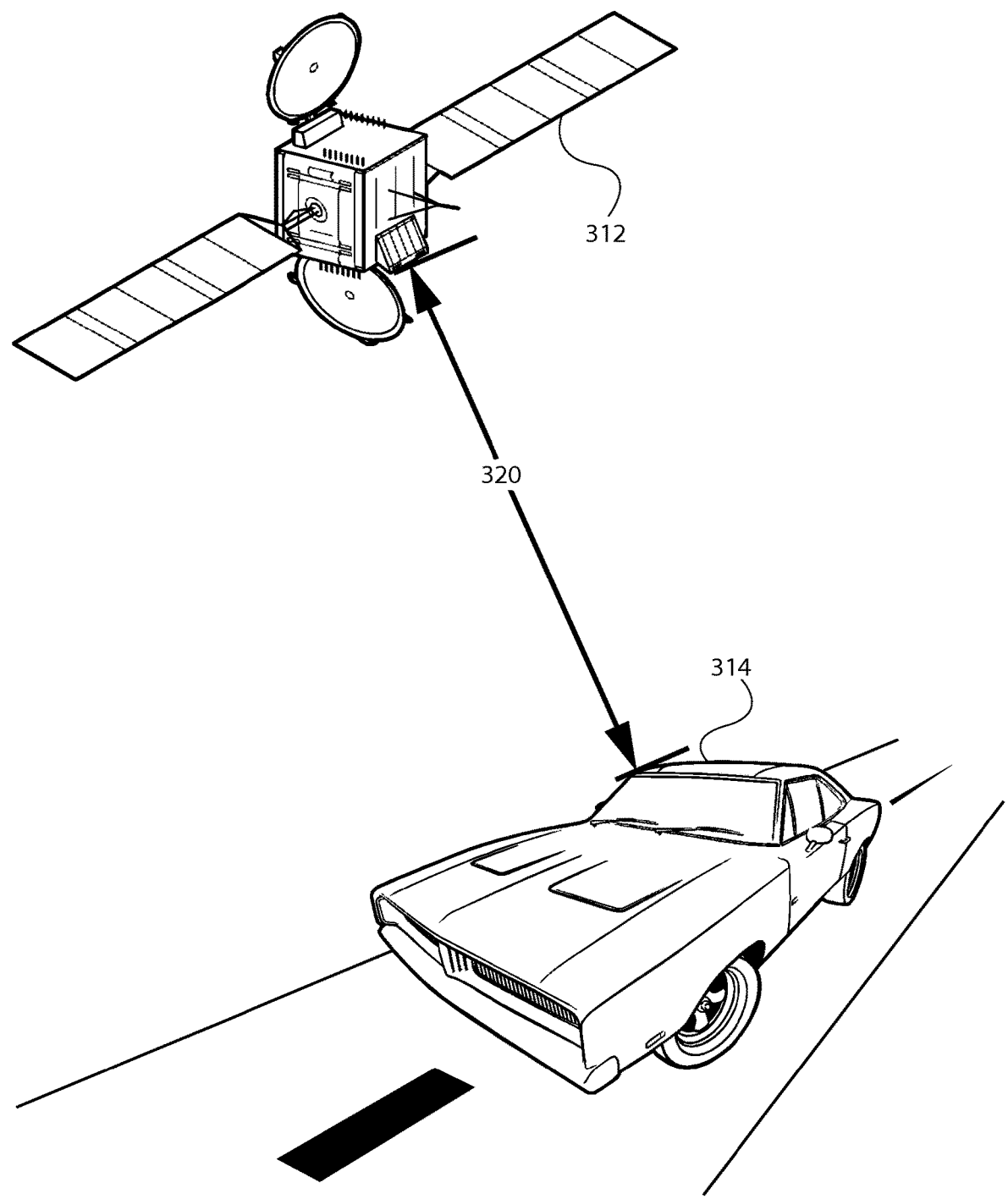
FIGS. 3A-3B are diagrams illustrating a pseudorange according to at least one example embodiment.
Figure 3B:
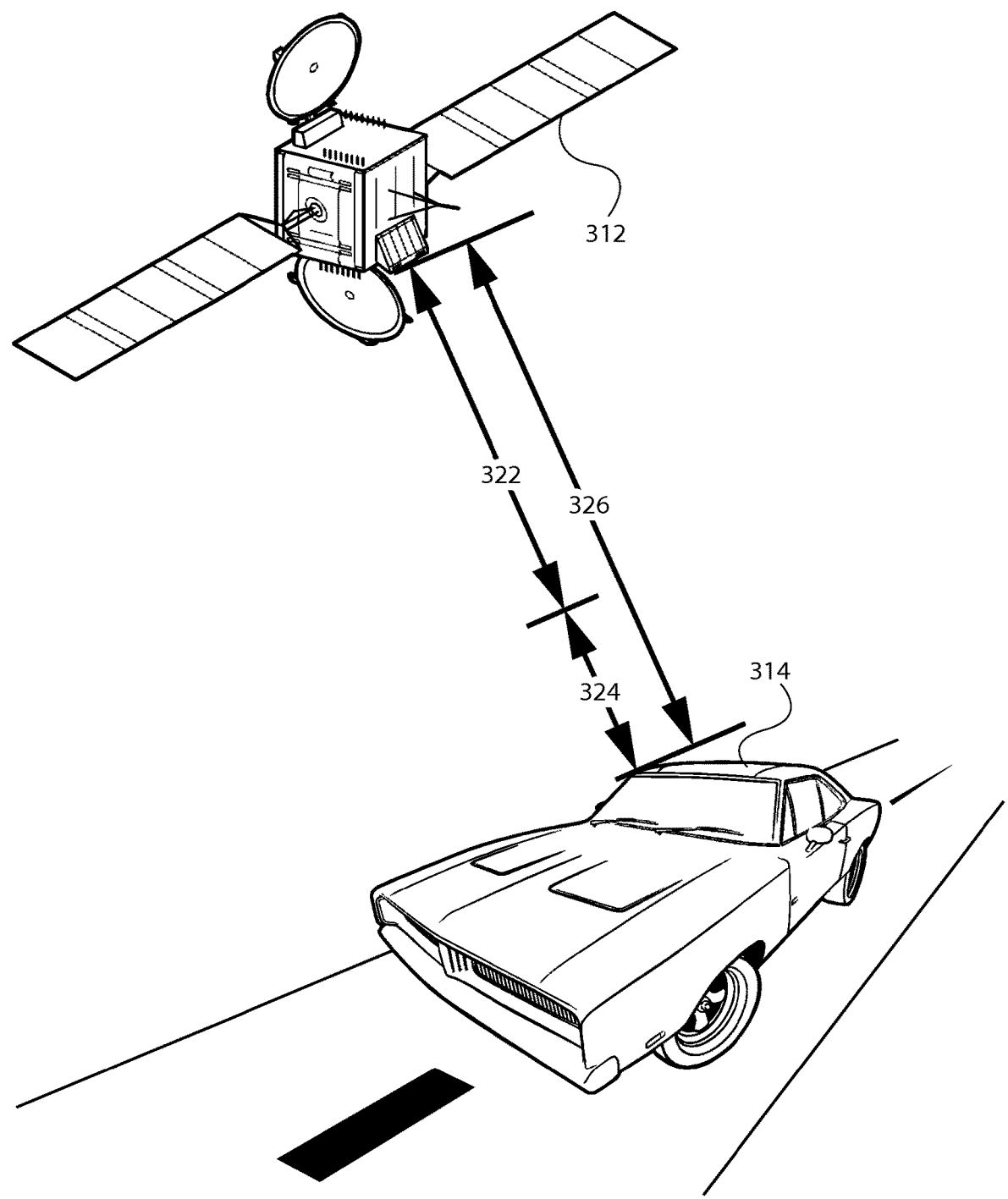

FIGS. 3A-3B are diagrams illustrating a pseudorange according to at least one example embodiment. The examples of FIGS. 3A-3B are merely examples and do not limit the scope of the claims. For example, the number, type, configuration, etc. of satellites may vary, the pseudorange may vary, the relative points used to measure the pseudorange may vary, and/or the like.

In many circumstances, it may be desirable to identify a position of a particular apparatus. For example, such a position may be used to support various navigation operations, routing functionality, assisted-driving technology, and/or the like. In such circumstances, an apparatus may utilize the Global Positioning System (GPS), the Global Navigation Satellite System (GLONASS), the Galileo satellite system, any satellite-based positioning system, and/or the like. GPS is a space-based satellite navigation system that provides location and time information in all weather conditions, anywhere on or near the earth, and where there is an unobstructed line of sight to four or more GPS satellites. Each GPS satellite continually broadcasts a signal that includes various GPS data. Such GPS data may include, for example, a pseudorandom code that is known to the receiver. By time-aligning a receiver-generated version and the receiver-measured version of the code, the time of arrival (TOA) of a defined point in the code sequence, called an epoch, can be found in the receiver clock time scale. Additionally, the GPS data may include the time of transmission (TOT) of the code epoch and the satellite position at that time. An apparatus, such as a GPS receiver, measures the TOAs, according to its own clock, of four satellite signals. Based on the TOAs and the TOTs, the apparatus calculates four time of flight (TOF) values. The apparatus may then compute its three-dimensional position and clock deviation from the four TOFs. The three-dimensional position is often a set of three dimensional Cartesian coordinates with origin at the earth's center. To facilitate utilization of this three-dimensional position, the earth-centered solution location may be converted to latitude, longitude, and altitude.

In at least one example embodiment, an apparatus receives GPS data from a plurality of GPS satellites. In such an example embodiment, the apparatus may subsequently determine a measured satellite pseudorange for each GPS satellite of the plurality of GPS satellites based, at least in part, on the GPS data. The measured satellite pseudorange of a GPS satellite is the pseudo distance between the GPS satellite and the apparatus, such as a GPS receiver. This distance is referred to as a pseudo distance due to the fact that the distance is not precise and is, instead, an estimation that is based, at least in part, on the TOF multiplied by the speed of light. To determine its position, an apparatus may determine the pseudoranges to at least four GPS satellites, as well as the positions of the at least four GPS satellites at the time of transmission. A position of a GPS satellite may be calculated for any point in time based, at least in part, on the orbital parameters of the GPS satellite. The pseudorange for each GPS satellite of the plurality of GPS satellites may be calculated by multiplying the speed of light by the time the signal has taken from each GPS satellite to reach the apparatus. As there are accuracy errors in the time measured, the term pseudorange is used, rather than ranges, for such distances. As such, in such an example embodiment, the measured satellite pseudorange for a particular GPS satellite of the plurality of GPS satellites may be a calculated distance between the particular GPS satellite and the apparatus.

Even though the above discussion relates to GPS, GPS data, GPS satellites, and/or the like, it should be understood that any satellite-based positioning system may be utilized. In this manner, the term GPS refers to any manner of satellite based positioning system. For example, any data from any satellite-based positioning system and any satellites associated with any satellite-based positioning system may be utilized. For example, the apparatus may receive GLONASS data from at least one GLONASS satellite, may receive Galileo data from at least one Galileo satellite, and/or the like. In such examples, the apparatus may determine a measured satellite pseudorange for each GLONASS satellite of a plurality of GLONASS satellites, for each Galileo satellite of the plurality of Galileo satellites, and/or the like.

FIG. 3A is a diagram illustrating a pseudorange according to at least one example embodiment. The example of FIG. 3A depicts satellite 312, apparatus 314, and measured satellite pseudorange 320. In the example of FIG. 3A, satellite 312 may be any positioning system satellite, a GPS satellite, and/or the like. Apparatus 314 may be an automobile, a GPS receiver comprised by an automobile, an electronic apparatus comprised by an automobile, and/or the like. In the example of FIG. 3A, apparatus 314 receives GPS data from at least satellite 312, and determines measured satellite pseudorange 320 for satellite 312 based, at least in part, on the GPS data. In such an example, measured satellite pseudorange 320 for satellite 312 may be a calculated distance between satellite 312 and apparatus 314. In the example of FIG. 3A, measured satellite pseudorange 320 may be calculated based, at least in part, on a position of satellite 312, a time of transmission, a time of arrival, the speed of light, and/or the like.

The manner in which a position is determined by way of GPS data is prone to errors due to the heavy reliance on accurate time keeping. As such, even the minutest discrepancies in time synchronization amongst GPS satellites and apparatuses, such as GPS receivers, results in very large positioning errors. For example, an apparatus may utilize a quartz oscillator to maintain time. The accuracy of such a quartz-based clock, in general, may be worse than one part in a million. If such a clock has not been corrected for a week, a measured satellite pseudorange based on that clock's time may result in a measured satellite pseudorange that places the apparatus not on the surface of Earth, but outside the Moon's orbit. Even if the clock is corrected, a second later the clock is again unusable for accurate calculation of a measured satellite pseudorange because, after a second, the error may result in determination of a position that is erroneous by hundreds of meters.

FIG. 3B is a diagram illustrating a pseudorange according to at least one example embodiment. The example of FIG. 3B depicts satellite 312, apparatus 314, measured satellite pseudorange 322, pseudorange error 324, and actual pseudorange 326. In the example of FIG. 3B, satellite 312 may be any positioning system satellite, a GPS satellite, and/or the like. Apparatus 314 may be an automobile, a GPS receiver comprised by an automobile, an electronic apparatus comprised by an automobile, and/or the like. In the example of FIG. 3B, apparatus 314 receives GPS data from at least satellite 312, and determines measured satellite pseudorange 322 for satellite 312 based, at least in part, on the GPS data. In such an example, measured satellite pseudorange 322 for satellite 312 may be a calculated distance between satellite 312 and apparatus 314. In the example of FIG. 3A, measured satellite pseudorange 322 may be calculated based, at least in part, on a position of satellite 312, a time of transmission, a time of arrival, the speed of light, and/or the like. As depicted in the example of FIG. 3B, actual pseudorange 326 is the actual distance between satellite 312 and apparatus 314. As can be seen, actual pseudorange 326 differs from measured satellite pseudorange 322 by an amount equal to pseudorange error 324.

In this manner, measured satellite pseudorange 322 may fail to accurately identify the distance between satellite 312 and apparatus 314. Such a discrepancy may be based, at least in part, on inaccurate time synchronization between GPS satellites, inaccurate time synchronization between GPS satellites and the apparatus, line of sight interference from buildings, multipath errors caused by indirect receipt of GPS data, and/or the like.

Figure 4A:
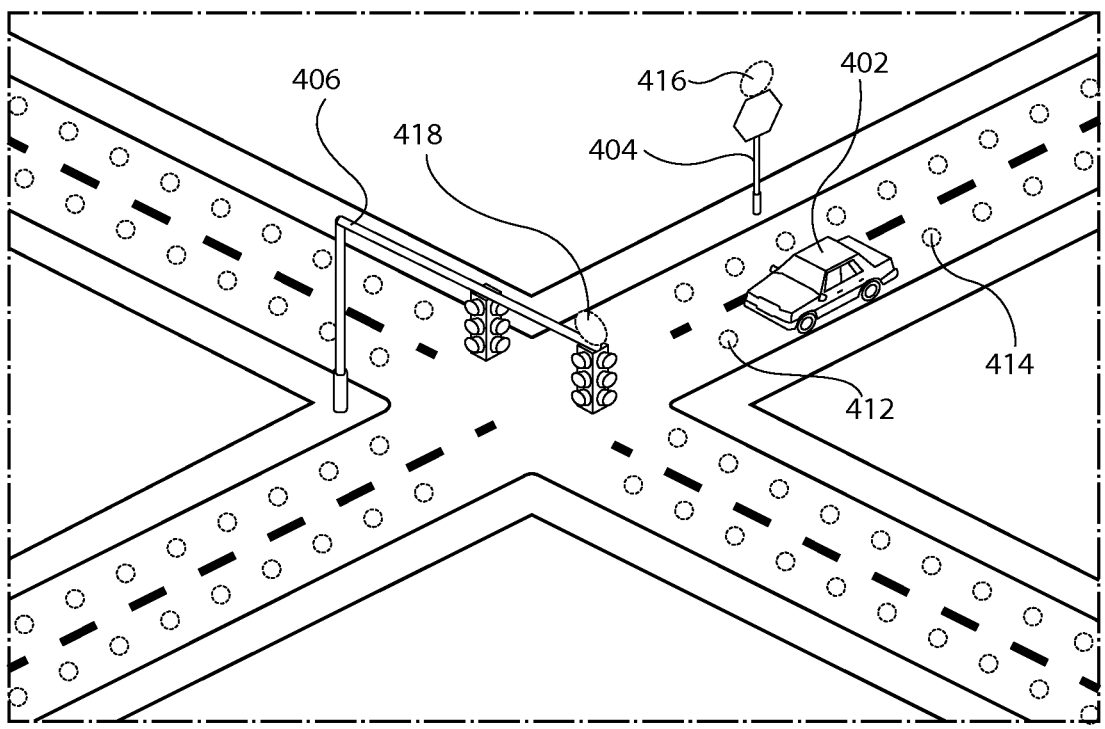
FIGS. 4A-4B are diagrams illustrating an apparatus in relation to various sensors according to at least one example embodiment.
Figure 4B:
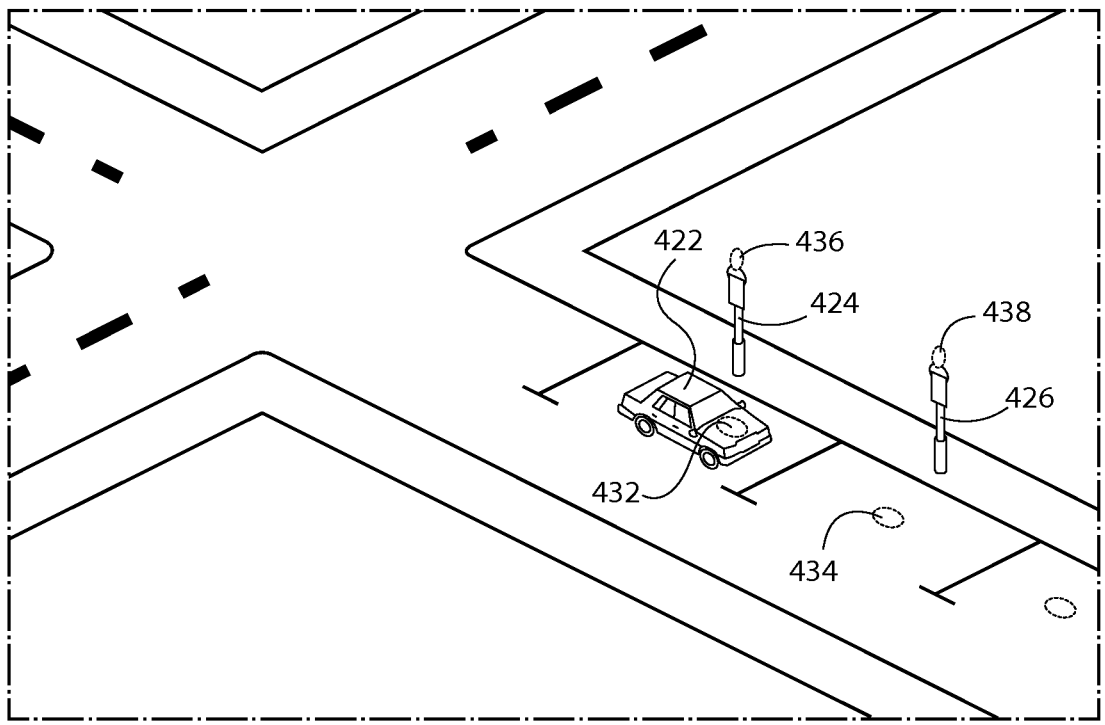

FIGS. 4A-4B are diagrams illustrating an apparatus in relation to various sensors according to at least one example embodiment. The examples of FIGS. 4A-4B are merely examples and do not limit the scope of the claims. For example, the number, type, configuration, arrangement, etc. of sensors may vary, the number, type, configuration, arrangement, etc. of the apparatus may vary, and/or the like.

GPS in urban areas containing high concentrations of tall buildings may be affected by the introduction of multipath-related errors in which an apparatus receives a signal comprising GPS data from a GPS satellite which has possibly been reflected off of a building. Receipt of a signal that has reflected off of a building may cause a delay in the receipt of the signal in relation to receipt of GPS data from other GPS satellites, which may result in measurement errors by the apparatus and, thus, positioning errors. This multipath problem is less severe in moving vehicles as these reflected signal fade quickly due to their high rate of speed. Pedestrians and cyclists, however, are much more affected by these errors as they move slower and frequently stop. As such, in many circumstances, it is difficult to determine accurate positioning information for pedestrians and cyclists in such urban environments, in environments with obstructed apparatus line of sight to one or more GPS satellites, and/or the like.

As such, it may be desirable to configure an apparatus such that the apparatus may determine a position based, at least in part, on data which is more reliable than GPS data, which is less susceptible to the introduction of errors, which is more accurate than GPS data, and/or the like. In at least one example embodiment, an apparatus receives non-GPS data from at least one sensor. For example, in such an example embodiment, the non-GPS data may be highly assisted driving data, and the at least one sensor may be a highly assisted driving sensor. Highly assisted driving (HAD) may refer to autonomous vehicles, assisted-driving functionalities, self-driving automobiles, and/or the like. In order to facilitate the maneuvering of such HAD automobiles, it is often necessary to maintain extremely accurate positioning information. Such positioning information may be based, at least in part, on highly accurate road maps, sensors comprised by an automobile, sensors external to the automobile, such as sensors embedded in roads, distributed around various thoroughfares, etc., and/or the like, and may provide for determination of a position of the automobile that is accurate to within a centimeter. For example, a plurality of radio frequency identification (RFID) sensors may be distributively embedded in various roadways. Each RFID sensor may be placed precisely at known locations. In circumstances in which an apparatus moves over an embedded RFID sensor, the apparatus may receive non-GPS data from the RFID sensor. For example, the apparatus may receive a unique identifier associated with the RFID such that the apparatus may determine an exact geographical location of that RFID sensor, the apparatus may receive information that identifies the geographical position of the RFID sensor, and/or the like. In another example, rather than be embedded in the roadway, a sensor may be comprised by a sign, a street light, a traffic signal, and/or the like. In this manner, an apparatus may receive non-GPS data from one or more sensors, such as HAD sensors, such that the apparatus may determine an apparatus position of the apparatus.

In some circumstances, a HAD system may also utilize one or more highly detailed maps, which may have been created previously by using various sensors, such as LIDAR, a camera, wheel rotation sensors, and IMUs (Inertial Measurement Units). Such a map may be stored on memory comprised by an apparatus, downloaded from a separate apparatus by way of one or more communication channels, and/or the like. Such maps may be accurate to within 1 centimeter. In such circumstances, an apparatus may utilize one or more sensors, such as LIDAR, a camera, IMUs, wheel sensors, etc. to compare against such a map in real-time. In this manner, the apparatus may be operable to determine an apparatus position of the apparatus with an accuracy that is within a few centimeters by way of comparing, correlating, etc. non-GPS data received from one or more sensors to map data comprised by one or more highly detailed maps in order to determine a highly accurate apparatus position of the apparatus.

In at least one example embodiment, an apparatus determines an apparatus position of the apparatus based, at least in part, on the non-GPS data. The apparatus position of the apparatus may, for example, be a set of geographical coordinates, a latitude, longitude, and altitude, and/or the like. In such an example embodiment, the determination of the apparatus position may be absent consideration of any GPS data. In this manner, the apparatus may determine the apparatus position without the introduction of errors associated with determination of an apparatus position that is based on GPS data. In circumstances in which a HAD system also utilizes one or more highly detailed maps, the apparatus may receive non-GPS data from at least one sensor, and correlate the non-GPS data with map data comprised by one or more highly detailed maps. In such circumstances, the apparatus may determine an apparatus position of the apparatus based, at least in part, on the non-global-positioning-system data and the map data.

FIG. 4A is a diagram illustrating an apparatus in relation to various sensors according to at least one example embodiment. The example of FIG. 4A depicts apparatus 402 in relation to various sensors. For example, FIG. 4A depicts sensors 412 and 414, amongst other sensors, embedded in the various lanes of the illustrated road, sensor 416 coupled to sign 404, and sensor 418 coupled to traffic signal 406. In this manner, apparatus 402 may receive non-GPS information from one or more of sensors 412, 414, 416, 418, and/or the like. In the example of FIG. 4A, apparatus 402 may determine an apparatus position of apparatus 402 based, at least in part, on the non-GPS data received from one or more of sensors 412, 414, 416, 418, and/or the like. In such an example, the determination of the apparatus position of apparatus 402 may be absent consideration of any GPS data. In this manner, apparatus 402 may determine the apparatus position without the introduction of errors associated with determination of an apparatus position that is based on GPS data.

FIG. 4B is a diagram illustrating an apparatus in relation to various sensors according to at least one example embodiment. The example of FIG. 4B depicts apparatus 422 in relation to various sensors. For example, FIG. 4B depicts sensors 432 and 434 embedded in the various parking spots, sensor 436 coupled to parking meter 424, and sensor 438 coupled to parking meter 426. In this manner, apparatus 422 may receive non-GPS information from one or more of sensors 432, 434, 436, 438, and/or the like. In the example of FIG. 4B, apparatus 422 may determine an apparatus position of apparatus 422 based, at least in part, on the non-GPS data received from one or more of sensors 432, 434, 436, 438, and/or the like. In such an example, the determination of the apparatus position of apparatus 422 may be absent consideration of any GPS data. In this manner, apparatus 422 may determine the apparatus position without the introduction of errors associated with determination of an apparatus position that is based on GPS data. For example, apparatus 422 may determine that it is parked in a particular parking spot based, at least in part, on being positioned over sensors 432, on being positioned adjacent to sensor 436, and/or the like. In another example, apparatus 422 may determine its apparatus position with centimeter accuracy based, at least in part, on its position relative to sensor 432, on triangulation of signals received from sensors 432, 434, 436, 438, etc., and/or the like.

FIGS. 5A-5D are diagrams illustrating broadcast transmission of information indicative of a pseudorange correction according to at least one example embodiment. The examples of FIGS. 5A-5D are merely examples and do not limit the scope of the claims. For example, the number, type, configuration, arrangement, etc. of the apparatus may vary, the range, shape, distribution, etc. of the broadcast transmission of the pseudorange correction may vary, the number, type, configuration, arrangement, etc. of the separate apparatuses may vary, and/or the like.

As described previously, in many circumstances, positioning based on GPS data may be prone to errors associated with signal multipath, time synchronization issues, erroneous pseudoranges, and/or the like. As such, it may be desirable to configure an apparatus such that the apparatus may facilitate more accurate, more precise, etc. positioning of an apparatus, a separate apparatus, an electronic apparatus, a GPS receiver, and/or the like. As the level of coverage of highly detailed map data increases and the utilization of sensors, such as HAD sensors, becomes more pervasive, along with vehicles capable of processing such map data and non-GPS data, apparatuses that can determine their location to a high degree of accuracy may be utilized to facilitate accurate positioning of separate apparatuses in environments in which the separate apparatus may encounter GPS errors, GPS inaccuracies, and/or the like. For example, such an apparatus may be configured as a highly accurate base station to provide increased positional accuracy for separate apparatuses proximate to the apparatus, within range of the apparatus, and/or the like. For example, an apparatus may be utilized as a source of Differential Global Positioning System (DGPS) signals, radio signal-based triangulation, and/or the like. In this manner, the apparatus may provide one or more separate apparatuses with information that facilitates determination of a more accurate position of each separate apparatus.

As described previously regarding the example of FIG. 3B, one or more measured satellite pseudoranges may be erroneous. For example, a measured satellite pseudorange may underestimate the distance between a GPS satellite and an apparatus, may overestimate the distance between the GPS satellite and the apparatus, and/or the like. In this manner, an apparatus position that is based on such GPS data and such erroneous measured satellite pseudoranges will inherently be erroneous. As such, it may be desirable to configure an apparatus such the apparatus may facilitate accurate positioning operations. In at least one example embodiment, an apparatus determines at least one pseudorange correction associated with at least one GPS satellite of a plurality of GPS satellites. In such an example embodiment, the determination of the pseudorange correction may be based, at least in part, on a measured satellite pseudorange and an apparatus position. For example, an apparatus may determine an actual pseudorange for each GPS satellite of the plurality of GPS satellites based, at least in part, on the apparatus position. In such an example, the determination of the pseudorange correction may be based, at least in part, on a difference between the measured satellite pseudorange and the actual pseudorange. For example, as depicted in FIG. 3B, the pseudorange correction may be utilized to correct pseudorange error 324 associated with measured satellite pseudorange 322 such that a GPS position of an apparatus may be determined based, at least in part, on the actual pseudorange 326. The pseudorange correction may, for example, be a value that is used to correct a measured satellite pseudorange. For example, the pseudorange correction may correct an erroneous measured satellite pseudorange such that the erroneous measured satellite, together with the pseudorange correction, approximate an actual pseudorange of the apparatus and the associated GPS satellite. Such a pseudorange correction may correct for multipath time discrepancies, time synchronization errors, line of sight issues, and/or the like.

In order to facilitate such correction of measured satellite pseudoranges, it may be desirable to configure an apparatus such that the apparatus may communicate information indicative of the correction to another apparatus. For example, the apparatus may cause sending of information indicative of a pseudorange correction to a separate apparatus, may cause broadcast transmission of information indicative of the pseudorange correction such that a separate apparatus may receive the information indicative of the pseudorange correction, and/or the like. The causation of broadcast transmission of information indicative of the pseudorange correction may, for example, comprise causation of broadcast transmission of information indicative of the pseudorange correction and information indicative of the GPS satellite associated with the pseudorange correction.

In some circumstances, it may be desirable to determine whether an apparatus should cause broadcast transmission of information indicative of the pseudorange correction. For example, in some circumstances, a measured satellite pseudorange may be sufficiently accurate such that broadcast transmission of information indicative of the pseudorange correction is unnecessary. In some circumstances, however, the measured satellite pseudorange may vary too greatly from an actual pseudorange. In such circumstances, it may be desirable to cause broadcast transmission of information indicative of the pseudorange correction based, at least in part, on the magnitude of the pseudorange error, a magnitude of the pseudorange correction, and/or the like. In at least one example embodiment, an apparatus determines that the pseudorange correction associated with the GPS satellite exceeds a pseudorange correction threshold. In such an example embodiment, the causation of broadcast transmission of information indicative of the pseudorange correction may be predicated by the determination that the pseudorange correction associated with the GPS satellite exceeds the pseudorange correction threshold. Such a pseudorange correction threshold may, for example, indicate a pseudorange correction beyond which the apparatus causes broadcast transmission of information indicative of the pseudorange correction. For example, the pseudorange correction threshold may indicate a minimum level of accuracy, such as +/−5 feet, +/−1 meter, +/−10 centimeters, +/−1 inch, and/or the like. In circumstances in which a pseudorange correction is indicative of a level of accuracy that is less than the minimum level of accuracy, the apparatus may determine that the pseudorange correction associated with the GPS satellite exceeds the pseudorange correction threshold, and cause broadcast transmission of information indicative of the pseudorange correction.

In some circumstances, an apparatus that is performing broadcast transmission of information indicative of a pseudorange correction may move from an apparatus position to a different apparatus position. In such circumstances, since errors associated with measured satellite pseudoranges are heavily impacted by the particular environmental factors associated with a particular apparatus position, it may be desirable to repeat one or more operations associated with determination of a pseudorange correction that is applicable to the different apparatus position. For example, an apparatus may receive GPS data from a plurality of GPS satellites, determine a measured satellite pseudorange for each GPS satellite of the plurality of GPS satellites, receive non-GPS data from at least one sensor, determine an apparatus position based, at least in part, on the non-GPS data, determine a pseudorange correction based, at least in part, on the measured satellite pseudorange and the apparatus position, and cause broadcast transmission of information indicative of the pseudorange correction. Subsequent, the apparatus may move to a different position. In such an example, the apparatus may receive different GPS data from the plurality of GPS satellites, and determine a different measured satellite pseudorange for each GPS satellite of the plurality of GPS satellites based, at least in part, on the different GPS data. In such an example, the apparatus may receive different non-GPS data from at least one sensor, and determine a different apparatus position of the apparatus based, at least in part, on the different non-GPS data. The determination of the different apparatus position may be absent any consideration of any GPS data. The apparatus may then determine at least one different pseudorange correction associated with at least one GPS satellite of the plurality of GPS satellites based, at least in part, on the different measured satellite pseudorange and the different apparatus position, and cause broadcast transmission of information indicative of the different pseudorange correction.

Figure 5A:
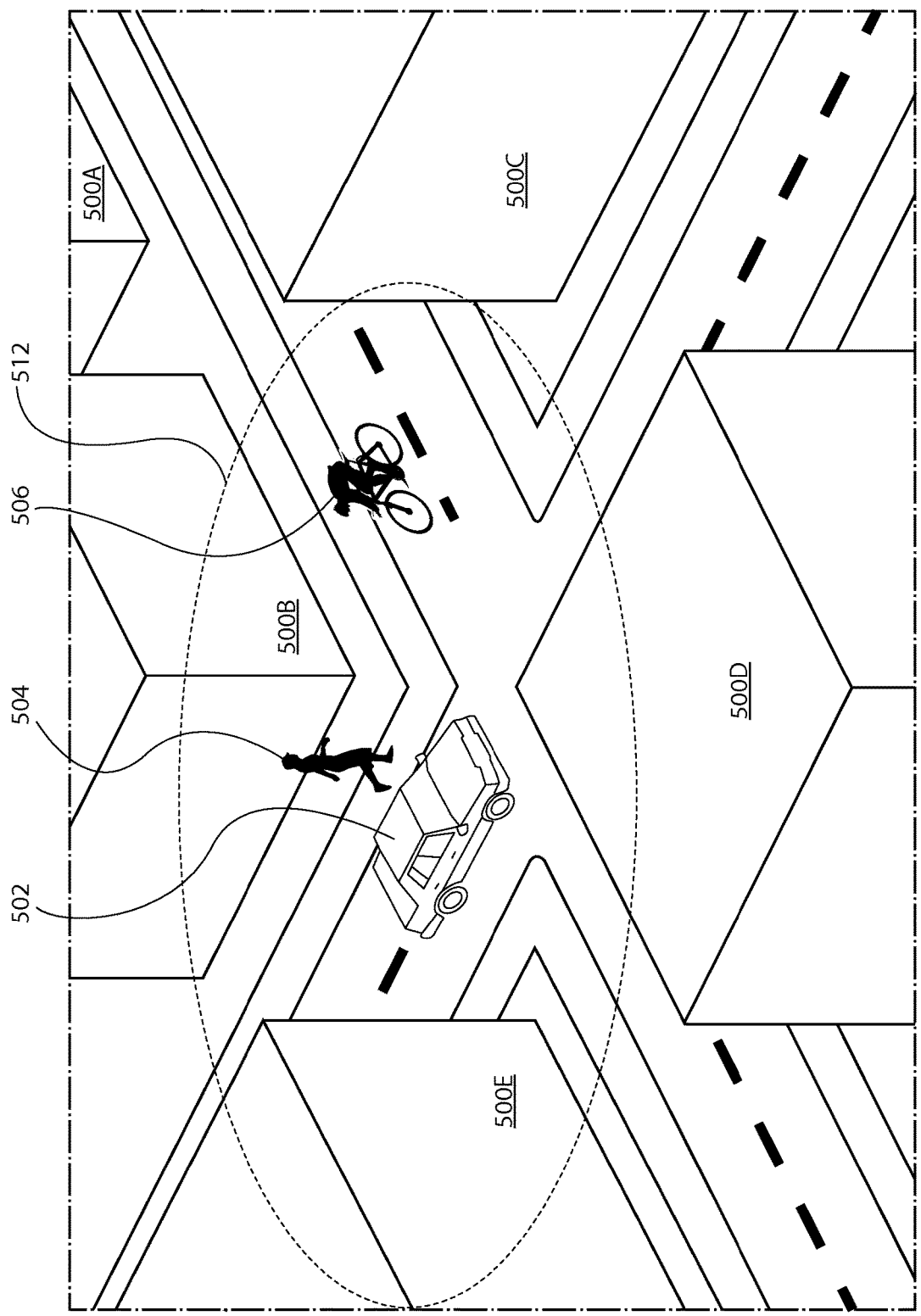
FIGS. 5A-5D are diagrams illustrating broadcast transmission of information indicative of a pseudorange correction according to at least one example embodiment.

FIG. 5A is a diagram illustrating broadcast transmission of information indicative of a pseudorange correction according to at least one example embodiment. The example of FIG. 5A depicts apparatus 502 in relation to pedestrian 504, cyclist 506, and buildings 500A-500E. As can be seen, FIG. 5A depicts an urban environment. In such an urban environment, buildings 500A-500E may interfere with reception of GPS data from one or more GPS satellites. For example, GPS data received by apparatus 502, an electronic apparatus of pedestrian 504, an electronic apparatus of cyclist 506, and/or the like may be prone to multipath errors and, thus, positioning errors, due to the proximity to buildings 500A-500E. As such, apparatus 502 may be caused to perform broadcast transmission of information indicative of one or more pseudorange corrections in order to support positioning functionality associated with electronic apparatuses utilized by pedestrian 504, cyclist 506, and/or the like. In such an example, apparatus 502 may determine that a pseudorange correction exceeds a pseudorange correction threshold, may receive information indicative of a broadcast enablement input, and/or the like. As can be seen, pedestrian 504 and cyclist 506 are within broadcast range of apparatus 502.

In some circumstances, it may be desirable to allow a user of an apparatus to selectively enable broadcast transmission of information indicative of the pseudorange correction. For example, the user may desire to utilize an electronic apparatus that is separate from the apparatus in a manner which allows for highly accurate positioning of the separate apparatus, may desire to facilitate highly accurate positioning of other separate apparatus being used by other users, and/or the like. In at least one example embodiment, an apparatus receives information indicative of a broadcast enablement input. In such an example embodiment, the determination of the apparatus position of the apparatus, the determination of the pseudorange correction associated with the GPS satellite, the causation of broadcast transmission of information indicative of the pseudorange correction, and/or the like may be based, at least in part, on the broadcast enablement input.

Figure 5B:
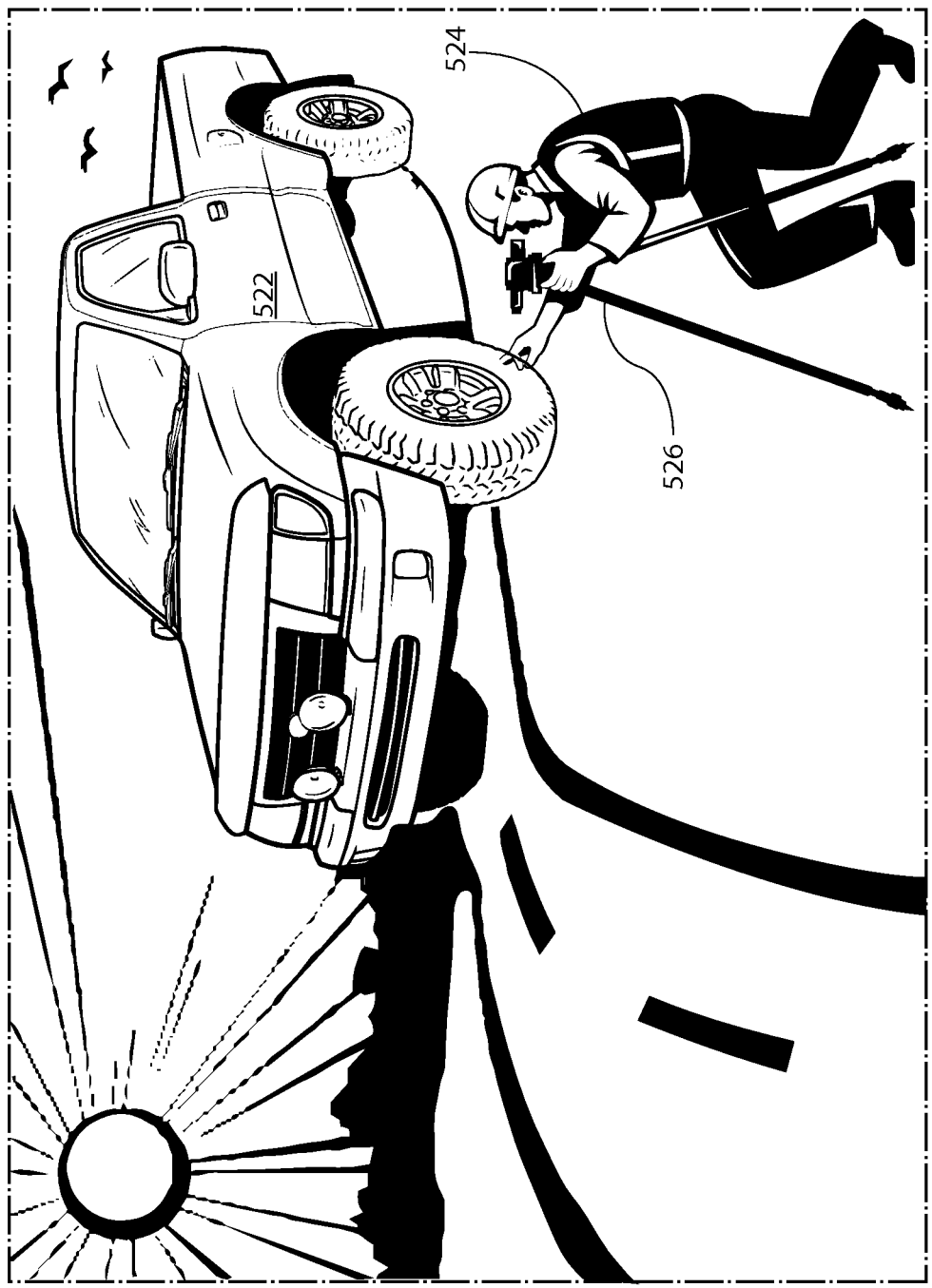

FIG. 5B is a diagram illustrating broadcast transmission of information indicative of a pseudorange correction according to at least one example embodiment. The example of FIG. 5B depicts apparatus 522, surveyor 524, and GPS receiver 526. In many circumstances, surveyor 524 may utilize GPS receiver 526 during performance of various property surveying duties. As such, it is highly important that the position of GPS receiver 526 is known to a high degree of accuracy. As discussed previously, in some circumstances, the GPS data received by GPS receiver 526 may be prone to various errors that drastically affect the accuracy of such GPS data and the determined position of GPS receiver 526. As such, apparatus 522 may be caused to perform broadcast transmission of information indicative of one or more pseudorange corrections in order to support positioning functionality associated with GPS receiver 526 of surveyor 524. In such an example, apparatus 522 may determine that a pseudorange correction exceeds a pseudorange correction threshold, may receive information indicative of a broadcast enablement input, and/or the like.

Figure 5C:
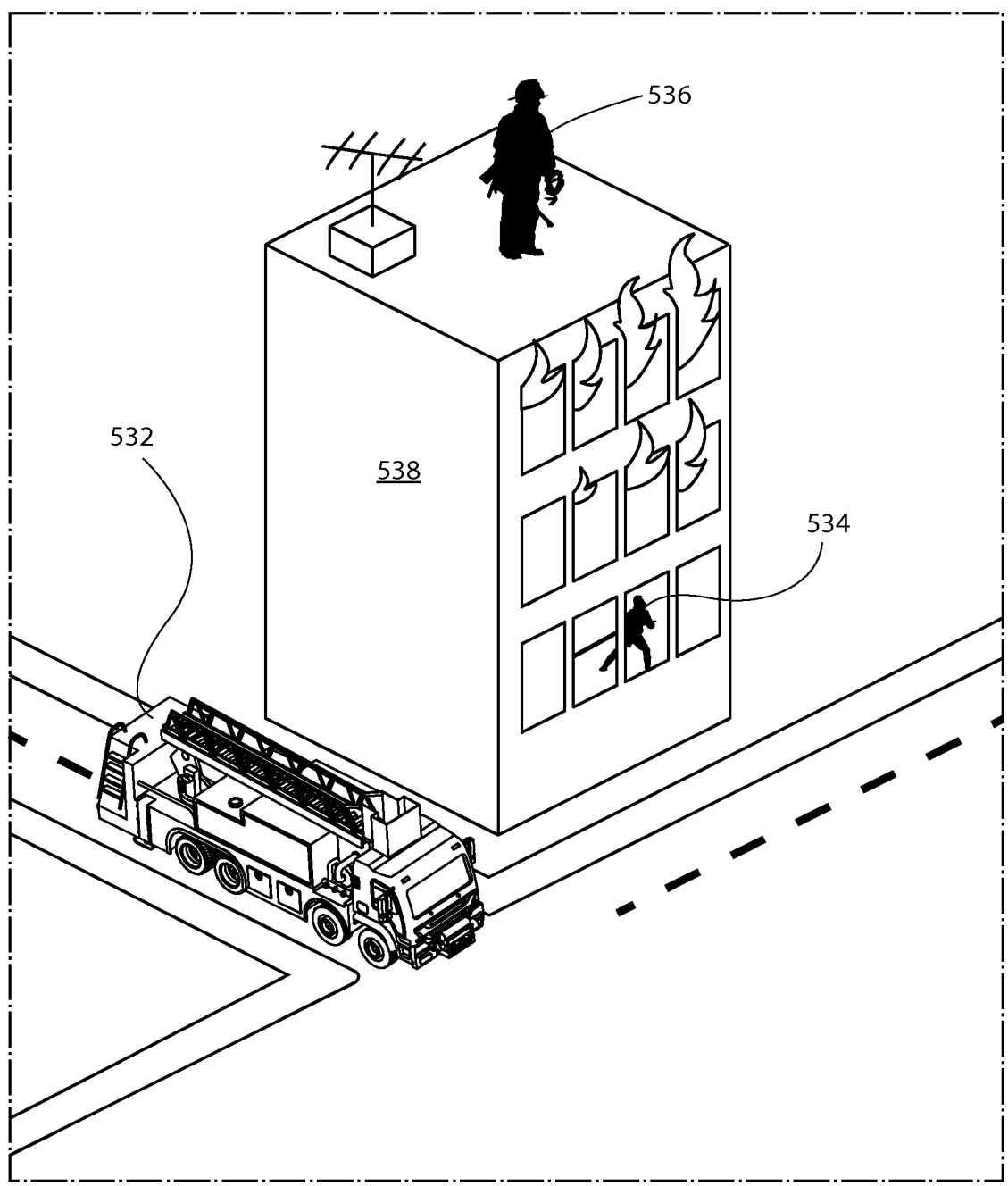

FIG. 5C is a diagram illustrating broadcast transmission of information indicative of a pseudorange correction according to at least one example embodiment. The example of FIG. 5C depicts apparatus 532, firefighters 534 and 536, and building 538. In many circumstances, firefighters 534 and 536 may utilize electronic apparatuses that allow the fire department and/or other firefighters to monitor the position of firefighters 524 and 536 within building 538. As such, it is highly important that the position of firefighters 524 and 536 are known to a high degree of accuracy. As discussed previously, in some circumstances, the GPS data received by the electronic apparatuses of firefighter 534 and/or firefighter 536 may be prone to various errors that drastically affect the accuracy of such GPS data and the determined positions. As such, apparatus 532 may be caused to perform broadcast transmission of information indicative of one or more pseudorange corrections in order to support positioning functionality associated with the electronic apparatuses of firefighter 534 and/or firefighter 536. In such an example, apparatus 532 may determine that a pseudorange correction exceeds a pseudorange correction threshold, may receive information indicative of a broadcast enablement input, and/or the like.

In some circumstances, it may be desirable to utilize more than one apparatus in order to facilitate the broadcast transmission of information indicative of the pseudorange correction. For example, it may be desirable to cause more than one apparatus to cause broadcast transmission of information indicative of the pseudorange correction, to transition such broadcast transmission from an apparatus to a separate apparatus, and/or the like. In at least one example embodiment, an apparatus receives information that identifies a separate apparatus as a broadcast apparatus candidate. A broadcast apparatus candidate may be any apparatus that is configured to cause broadcast transmission of information indicative of a pseudorange correction. In such an example embodiment, the apparatus may cause sending of a broadcast directive to the separate apparatus. The causation of sending of the broadcast directive to the separate apparatus may, for example, comprise causation of broadcast transmission of information indicative of the broadcast directive. The broadcast directive may, for example, be a directive that, when received by a separate apparatus, cause the separate apparatus to perform one or more operations in conformance with the directive. For example, the broadcast directive may comprise a set of instructions that, when received by a separate apparatus, cause the separate apparatus to perform operations in conformance with at least a portion of the instructions. Such a broadcast directive may be configured to cause the separate apparatus to initiate broadcast transmission of information indicative of at least another pseudorange correction, may identify the apparatus, may identify the particular separate apparatus, may identify one or more pseudorange corrections associated with one or more GPS satellites, and/or the like.

As discussed previously, in some circumstances, it may be desirable to utilize more than one apparatus in order to facilitate the broadcast transmission of information indicative of the pseudorange correction. In such circumstances, it may be desirable to conditionally cause sending of a broadcast directive to a separate apparatus. For example, an apparatus may be constrained by various factors that limit a range associated with the broadcast transmission of information indicative of the pseudorange correction, a duration during which the apparatus may cause broadcast transmission of information indicative of the pseudorange correction, and/or the like. For example, an apparatus may utilize a battery to support various functions associated with the apparatus. For example, an apparatus may be comprised by an automobile, and the automobile battery may be required to start the engine of the automobile, to provide power for the broadcast transmission of information indicative of the pseudorange correction, and/or the like. As such, it may be desirable to ensure that the battery of the automobile sustains a minimum charge that is sufficient for starting the automobile. In such circumstances, a separate apparatus may be caused to begin broadcast transmission of information indicative of a pseudorange correction that is associated with the apparatus position of the separate apparatus.

In at least one example embodiment, an apparatus receives information that identifies a separate apparatus as a broadcast apparatus candidate. In such an example embodiment, the apparatus may determine that at least one broadcast hand-off condition has been satisfied, and cause sending of a broadcast directive to the separate apparatus based, at least in part, on the determination that the broadcast hand-off condition has been satisfied. The broadcast directive may, for example, be configured to cause the separate apparatus to initiate broadcast transmission of information indicative of at least another pseudorange correction. The other pseudorange correction may be the pseudorange correction, a different pseudorange correction, and/or the like. In some circumstances, the apparatus may continue broadcast transmission of the information indicative of the pseudorange correction. In some circumstances, however, it may be desirable to discontinue such broadcast transmission. In at least one example embodiment, an apparatus causes termination of broadcast transmission of information indicative of the pseudorange correction based, at least in part, on the determination that the broadcast hand-off condition has been satisfied.

In some circumstances, a plurality of broadcast apparatus candidates may be available. In such circumstances, it may be desirable to cause sending of a broadcast directive to a particular broadcast apparatus candidate that is most favorable for initiation of broadcast transmission of such information. For example, a particular broadcast apparatus candidate may be at an apparatus position that is favorable for such broadcast transmission, may have a battery that is charged to near capacity, may have a more powerful transmitter that allows for broadcast transmission over a larger range, and/or the like. For example, an apparatus may receive information that identifies a separate apparatus as a broadcast apparatus candidate and information that identifies another separate apparatus as another broadcast apparatus candidate. In such an example, the apparatus may determine that the separate apparatus is more favorable for causation of initiation of broadcast transmission of information indicative of the other pseudorange correction than the other separate apparatus, wherein the causation of sending of the broadcast directive to the separate apparatus is based, at least in part, on the determination that the separate apparatus is more favorable for causation of initiation of broadcast transmission of information indicative of the other pseudorange correction than the other separate apparatus. For example, the apparatus may receive information indicative of a battery level associated with the apparatus. In such an example, the broadcast hand-off condition may indicate a battery level threshold, and the determination that the broadcast hand-off condition has been satisfied may comprise determination that the battery level is less than the battery level threshold. In such circumstances, the selection of the broadcast apparatus candidate that is to be caused to cause broadcast transmission of information indicative of a pseudorange correction may be a distributed vote-based system that polls various broadcast apparatus candidates for various information which may be pertinent to the determination of the most favorable broadcast apparatus candidate, may be based, at least in part, on a most favorable apparatus position of each broadcast apparatus candidate, and/or the like. For example, a plurality of broadcast apparatus candidates may compare one or more aspects, such as battery charge, apparatus position, transmitter range, and/or the like, and collectively elect a particular apparatus to begin broadcast transmission of information indicative of one or more pseudorange corrections associated with one or more GPS satellites. Such pseudorange corrections may be based, at least in part, on measured satellite pseudoranges associated with the selected broadcast apparatus candidate and the apparatus position of the selected broadcast apparatus candidate.

As discussed previously, in many circumstances, errors associated with a measured satellite pseudorange are heavily dependent on a particular apparatus position. As such, in some circumstances, it may be desirable to terminate broadcast transmission of information indicative of a pseudorange correction when an apparatus is in motion, when an apparatus position is no longer favorable for broadcast transmission of information indicative of the pseudorange correction, and/or the like. For example, an apparatus may determine an apparatus position based, at least in part, on non-GPS data and, subsequently, determine a different apparatus position based, at least in part, on different non-GPS data. In such an example, the apparatus may determine that the apparatus is in motion based, at least in part, on the apparatus position and the different apparatus position. For example, the apparatus may determine that the apparatus has vacated a parking space, left a garage, resumed movement after being stopped at a traffic signal, and/or the like. In such an example, it may be desirable to cause a separate apparatus to cause broadcast transmission of information indicative of another pseudorange correction. For example, the apparatus may cause termination of such broadcast transmission, and the separate apparatus may initiate such broadcast transmission in place of the apparatus. As such, the causation of sending of the broadcast directive to a separate apparatus may be based, at least in part, on the determination that the apparatus is in motion. In such an example, the apparatus may cause termination of broadcast transmission of information indicative of the pseudorange correction based, at least in part, on the determination that the apparatus is in motion. For example, the determination that the apparatus is in motion may comprise determination that the apparatus vacated a parking space, and the information that identifies the separate apparatus as the broadcast apparatus candidate may indicate that the separate apparatus is positioned in a different parking space. In such an example, the causation of sending of the broadcast directive to the separate apparatus may be based, at least in part, on the determination that the apparatus vacated the parking space and the separate apparatus being positioned within the different parking space.

In some circumstances, the apparatus may itself be a broadcast apparatus candidate that is selected for causation of broadcast transmission of information indicative of a pseudorange correction. In at least one example embodiment, an apparatus receives a broadcast directive from a separate apparatus. In such an example embodiment, the determination of the apparatus position of the apparatus, the determination of the pseudorange correction associated with the GPS satellite, the causation of broadcast transmission of information indicative of the pseudorange correction, and/or the like may be based, at least in part, on the receipt of the broadcast directive.

Figure 5D:
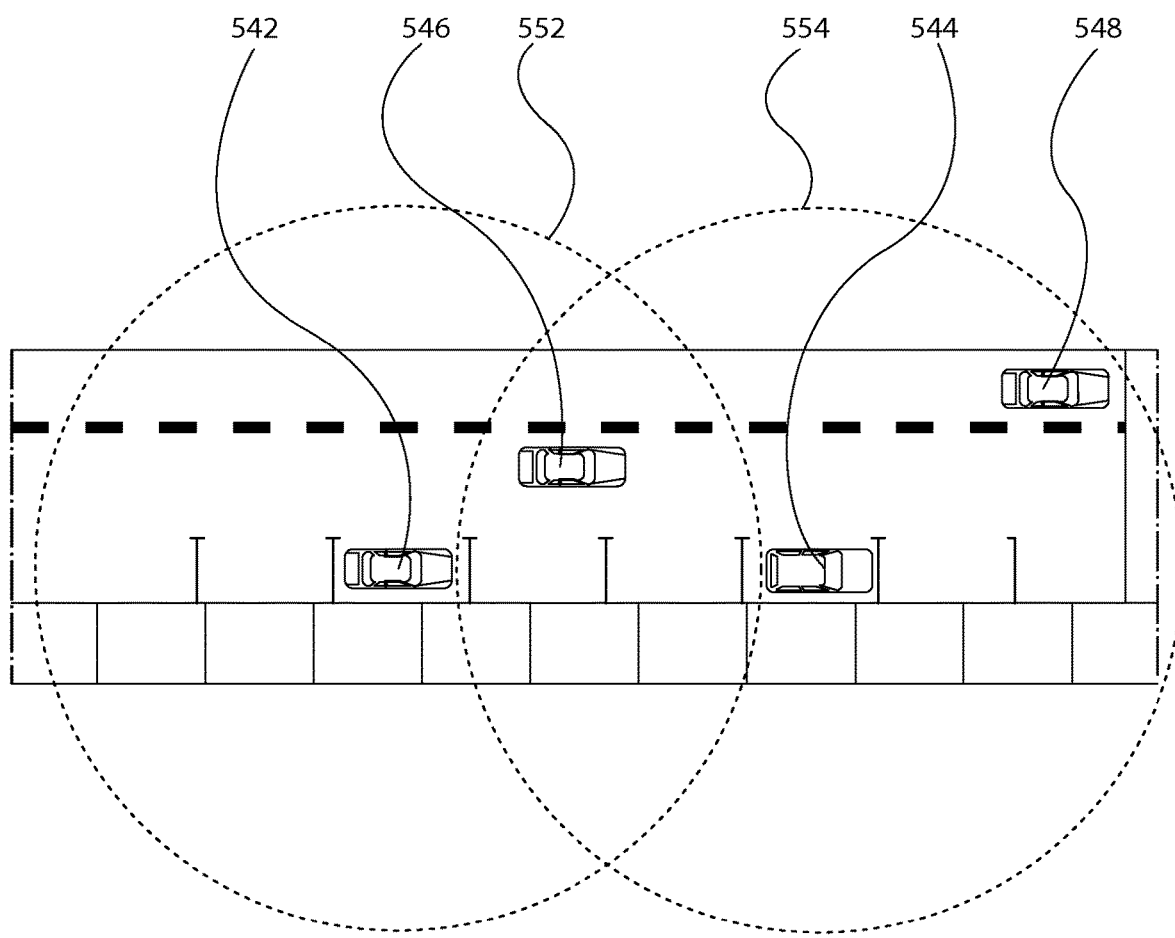

FIG. 5D is a diagram illustrating broadcast transmission of information indicative of a pseudorange correction according to at least one example embodiment. The example of FIG. 5D depicts apparatus 542, apparatus 544, separate apparatus 546, and separate apparatus 548. As can be seen, apparatus 542 and apparatus 544 may be parked in on-street parking. As can be seen, broadcast range 552 represents a range of a broadcast transmission of information indicative of one or more pseudorange corrections from apparatus 542, and broadcast range 554 represents a range of a broadcast transmission of information indicative of one or more pseudorange corrections from apparatus 544. Although the example of FIG. 5D depicts both apparatus 542 and apparatus 544 simultaneously performing such broadcast transmission, in some circumstances, only one of apparatus 542 or apparatus 544 may be performing such broadcast transmission. For example, apparatus 542 may initially be caused to perform broadcast transmission of information indicative of one or more pseudorange corrections, and may subsequently send a broadcast directive to apparatus 544, may broadcast a broadcast directive that identifies apparatus 544, and/or the like such that apparatus 544 is caused to perform broadcast transmission of information indicative of one or more pseudorange corrections. In such an example, separate apparatuses 546 and 548 may utilize the pseudorange correction to enhance various position-based functionality associated with apparatuses 546 and/or 548.

Figure 6:
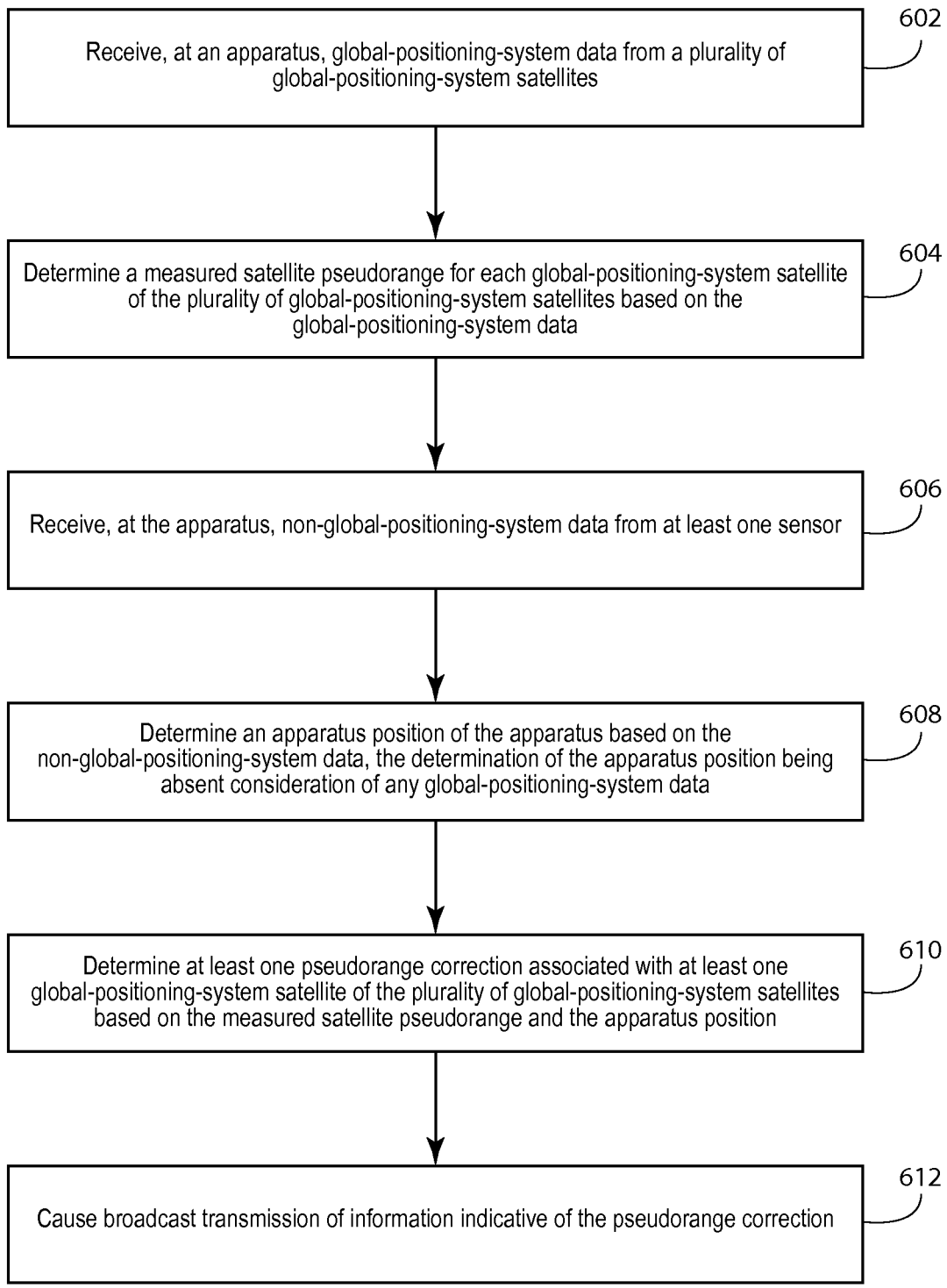
FIG. 6 is a flow diagram illustrating activities associated with causation of broadcast transmission of information indicative of a pseudorange correction according to at least one example embodiment.

FIG. 6 is a flow diagram illustrating activities associated with causation of broadcast transmission of information indicative of a pseudorange correction according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus receives global-positioning-system data from a plurality of global-positioning-system satellites. The receipt, the apparatus, the global-positioning-system data, and the plurality of global-positioning-system satellites may be similar as described regarding FIGS. 2A-2B and FIGS. 3A-3B.

At block 604, the apparatus determines a measured satellite pseudorange for each global-positioning-system satellite of the plurality of global-positioning-system satellites based, at least in part, on the global-positioning-system data. The determination and the measured satellite pseudorange for each global-positioning-system satellite of the plurality of global-positioning-system satellites may be similar as described regarding FIGS. 3A-3B.

At block 606, the apparatus receives non-global-positioning-system data from at least one sensor. The receipt, the non-global-positioning-system data, and the at least one sensor may be similar as described regarding FIGS. 2A-2B, FIGS. 3A-3B, and FIGS. 4A-4B.

At block 608, the apparatus determines an apparatus position of the apparatus based, at least in part, on the non-global-positioning-system data. In at least one example embodiment, the determination of the apparatus position is absent consideration of any global-positioning-system data. The determination and the apparatus position may be similar as described regarding FIGS. 3A-3B, FIGS. 4A-4B, and FIGS. 5A-5D.

At block 610, the apparatus determines at least one pseudorange correction associated with at least one globalpositioning-system satellite of the plurality of global-positioning-system satellites based, at least in part, on the measured satellite pseudorange and the apparatus position. The determination and the at least one pseudorange correction may be similar as described regarding FIGS. 3A-3B, FIGS. 4A-4B, and FIGS. 5A-5D.

At block 612, the apparatus causes broadcast transmission of information indicative of the pseudorange correction. In at least one example embodiment, the apparatus causes broadcast transmission of the pseudorange correction together with information indicative of the global-positioning-system satellite associated with the pseudorange correction. The causation of broadcast transmission of information indicative of the pseudorange correction may be similar as described regarding FIG. 2, FIGS. 3A-3B, FIGS. 4A-4B, and FIGS. 5A-5D.

Figure 7:
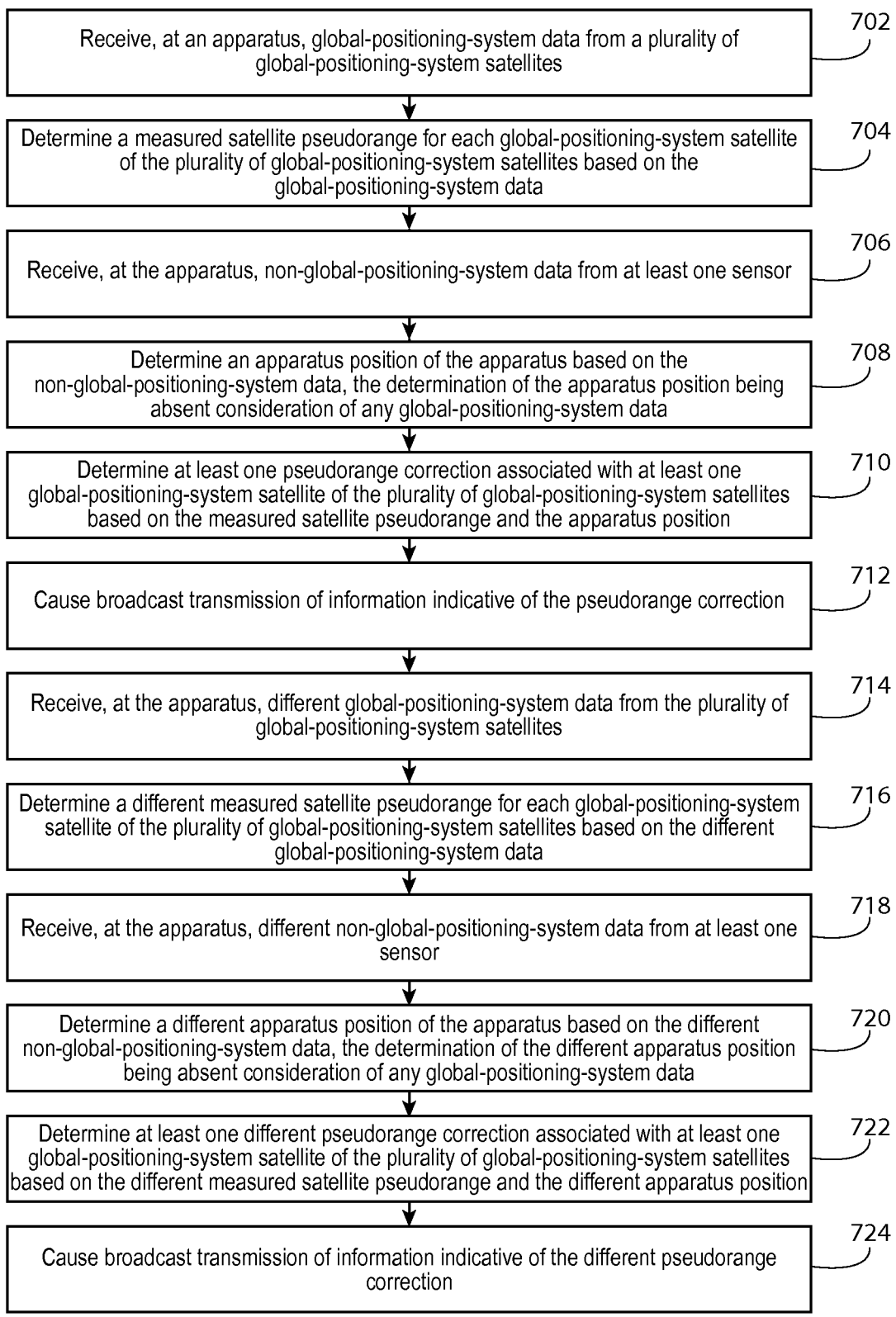
FIG. 7 is a flow diagram illustrating activities associated with causation of broadcast transmission of information indicative of a different pseudorange correction according to at least one example embodiment.

FIG. 7 is a flow diagram illustrating activities associated with causation of broadcast transmission of information indicative of a different pseudorange correction according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As described previously, in some circumstances, an apparatus may move to a different apparatus position, determine at least one different pseudorange correction, and cause broadcast transmission of the different pseudorange correction.

At block 702, the apparatus receives global-positioning-system data from a plurality of global-positioning-system satellites. The receipt, the apparatus, the global-positioning-system data, and the plurality of global-positioning-system satellites may be similar as described regarding FIGS. 2A-2B and FIGS. 3A-3B.

At block 704, the apparatus determines a measured satellite pseudorange for each global-positioning-system satellite of the plurality of global-positioning-system satellites based, at least in part, on the global-positioning-system data. The determination and the measured satellite pseudorange for each global-positioning-system satellite of the plurality of global-positioning-system satellites may be similar as described regarding FIGS. 3A-3B.

At block 706, the apparatus receives non-global-positioning-system data from at least one sensor. The receipt, the non-global-positioning-system data, and the at least one sensor may be similar as described regarding FIGS. 2A-2B, FIGS. 3A-3B, and FIGS. 4A-4B.

At block 708, the apparatus determines an apparatus position of the apparatus based, at least in part, on the non-global-positioning-system data. In at least one example embodiment, the determination of the apparatus position is absent consideration of any global-positioning-system data. The determination and the apparatus position may be similar as described regarding FIGS. 3A-3B, FIGS. 4A-4B, and FIGS. 5A-5D.

At block 710, the apparatus determines at least one pseudorange correction associated with at least one global-positioning-system satellite of the plurality of global-positioning-system satellites based, at least in part, on the measured satellite pseudorange and the apparatus position. The determination and the at least one pseudorange correction may be similar as described regarding FIGS. 3A-3B, FIGS. 4A-4B, and FIGS. 5A-5D.

At block 712, the apparatus causes broadcast transmission of information indicative of the pseudorange correction. In at least one example embodiment, the apparatus causes broadcast transmission of the pseudorange correction together with information indicative of the global-positioning-system satellite associated with the pseudorange correction. The causation of broadcast transmission of information indicative of the pseudorange correction may be similar as described regarding FIG. 2, FIGS. 3A-3B, FIGS. 4A-4B, and FIGS. 5A-5D.

At block 714, the apparatus receives different global-positioning-system data from a plurality of global-positioning-system satellites. The receipt and the different global-positioning-system data may be similar as described regarding FIGS. 2A-2B and FIGS. 3A-3B.

At block 716, the apparatus determines a different measured satellite pseudorange for each global-positioning-system satellite of the plurality of global-positioning-system satellites based, at least in part, on the different global-positioning-system data. The determination and the different measured satellite pseudorange for each global-positioning-system satellite of the plurality of global-positioning-system satellites may be similar as described regarding FIGS. 3A-3B.

At block 718, the apparatus receives different non-global-positioning-system data from at least one sensor. The receipt and the different non-global-positioning-system data may be similar as described regarding FIGS. 2A-2B, FIGS. 3A-3B, and FIGS. 4A-4B.

At block 720, the apparatus determines a different apparatus position of the apparatus based, at least in part, on the different non-global-positioning-system data. In at least one example embodiment, the determination of the apparatus position is absent consideration of any global-positioning-system data. The determination and the different apparatus position may be similar as described regarding FIGS. 3A-3B, FIGS. 4A-4B, and FIGS. 5A-5D.

At block 722, the apparatus determines at least one different pseudorange correction associated with at least one global-positioning-system satellite of the plurality of global-positioning-system satellites based, at least in part, on the different measured satellite pseudorange and the different apparatus position. The determination and the at least one different pseudorange correction may be similar as described regarding FIGS. 3A-3B, FIGS. 4A-4B, and FIGS. 5A-5D.

At block 724, the apparatus causes broadcast transmission of information indicative of the different pseudorange correction. In at least one example embodiment, the apparatus causes broadcast transmission of the different pseudorange correction together with information indicative of the global-positioning-system satellite associated with the different pseudorange correction. The causation of broadcast transmission of information indicative of the different pseudorange correction may be similar as described regarding FIG. 2, FIGS. 3A-3B, FIGS. 4A-4B, and FIGS. 5A-5D.

Figure 8:
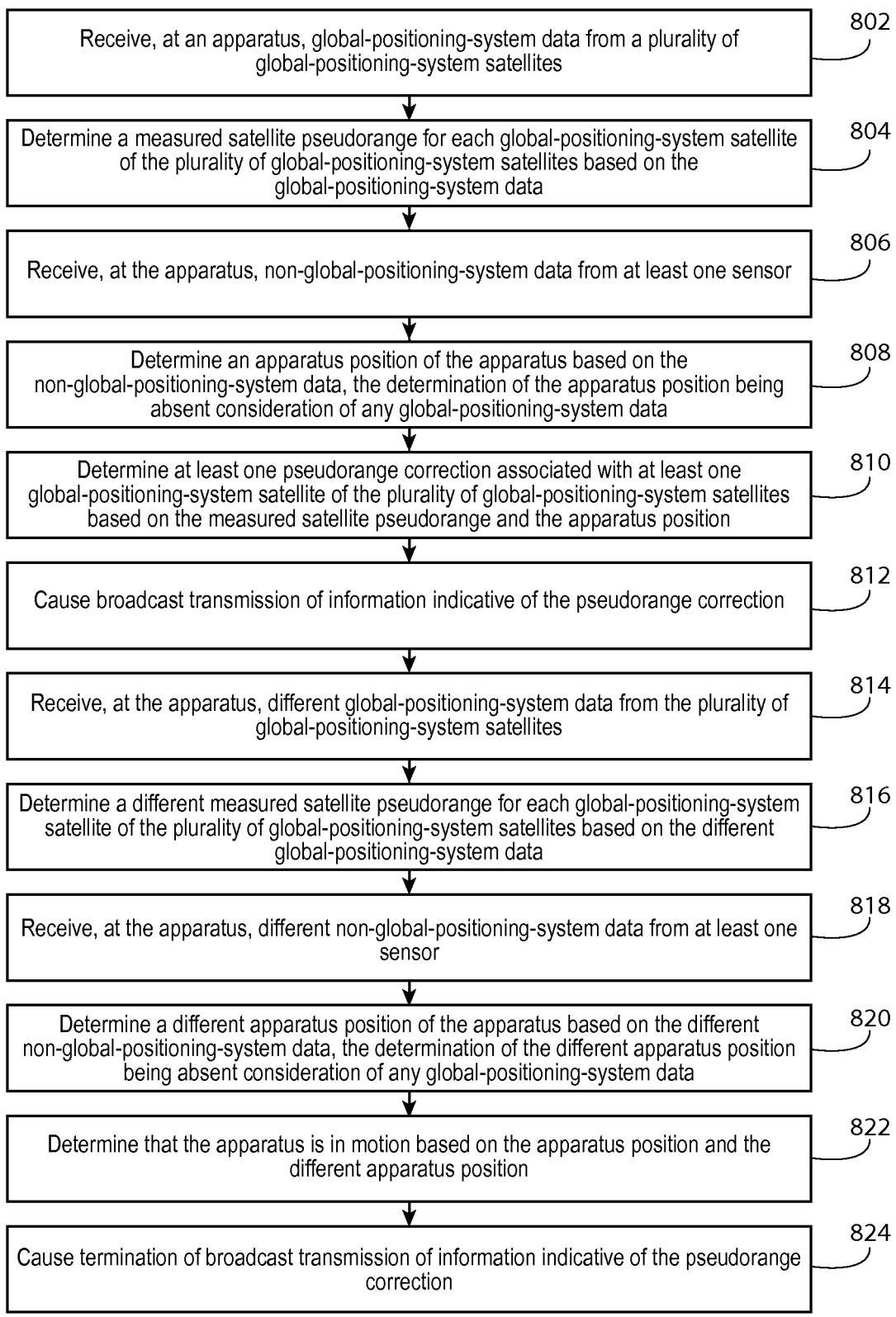
FIG. 8 is a flow diagram illustrating activities associated with causation of termination of broadcast transmission of information indicative of a pseudorange correction according to at least one example embodiment.

FIG. 8 is a flow diagram illustrating activities associated with causation of termination of broadcast transmission of information indicative of a pseudorange correction according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As described previously, in some circumstances, an apparatus may cause termination of broadcast transmission of information indicative of the pseudorange correction based, at least in part, on the determination that the apparatus is in motion.

At block 802, the apparatus receives global-positioning-system data from a plurality of global-positioning-system satellites. The receipt, the apparatus, the global-positioning-system data, and the plurality of global-positioning-system satellites may be similar as described regarding FIGS. 2A-2B and FIGS. 3A-3B.

At block 804, the apparatus determines a measured satellite pseudorange for each global-positioning-system satellite of the plurality of global-positioning-system satellites based, at least in part, on the global-positioning-system data. The determination and the measured satellite pseudorange for each global-positioning-system satellite of the plurality of global-positioning-system satellites may be similar as described regarding FIGS. 3A-3B.

At block 806, the apparatus receives non-global-positioning-system data from at least one sensor. The receipt, the non-global-positioning-system data, and the at least one sensor may be similar as described regarding FIGS. 2A-2B, FIGS. 3A-3B, and FIGS. 4A-4B.

At block 808, the apparatus determines an apparatus position of the apparatus based, at least in part, on the non-global-positioning-system data. In at least one example embodiment, the determination of the apparatus position is absent consideration of any global-positioning-system data. The determination and the apparatus position may be similar as described regarding FIGS. 3A-3B, FIGS. 4A-4B, and FIGS. 5A-5D.

At block 810, the apparatus determines at least one pseudorange correction associated with at least one global-positioning-system satellite of the plurality of global-positioning-system satellites based, at least in part, on the measured satellite pseudorange and the apparatus position. The determination and the at least one pseudorange correction may be similar as described regarding FIGS. 3A-3B, FIGS. 4A-4B, and FIGS. 5A-5D.

At block 812, the apparatus causes broadcast transmission of information indicative of the pseudorange correction. In at least one example embodiment, the apparatus causes broadcast transmission of the pseudorange correction together with information indicative of the global-positioning-system satellite associated with the pseudorange correction. The causation of broadcast transmission of information indicative of the pseudorange correction may be similar as described regarding FIG. 2, FIGS. 3A-3B, FIGS. 4A-4B, and FIGS. 5A-5D.

At block 814, the apparatus receives different global-positioning-system data from a plurality of global-positioning-system satellites. The receipt and the different global-positioning-system data may be similar as described regarding FIGS. 2A-2B and FIGS. 3A-3B.

At block 816, the apparatus determines a different measured satellite pseudorange for each global-positioning-system satellite of the plurality of global-positioning-system satellites based, at least in part, on the different global-positioning-system data. The determination and the different measured satellite pseudorange for each global-positioning-system satellite of the plurality of global-positioning-system satellites may be similar as described regarding FIGS. 3A-3B.

At block 818, the apparatus receives different non-global-positioning-system data from at least one sensor. The receipt and the different non-global-positioning-system data may be similar as described regarding FIGS. 2A-2B, FIGS. 3A-3B, and FIGS. 4A-4B.

At block 820, the apparatus determines a different apparatus position of the apparatus based, at least in part, on the different non-global-positioning-system data. In at least one example embodiment, the determination of the apparatus position is absent consideration of any global-positioning-system data. The determination and the different apparatus position may be similar as described regarding FIGS. 3A-3B, FIGS. 4A-4B, and FIGS. 5A-5D.

At block 822, the apparatus determines that the apparatus is in motion based, at least in part, on the apparatus position and the different apparatus position. The determination that the apparatus is in motion may be similar as described regarding FIGS. 3A-3B, FIGS. 4A-4B, and FIGS. 5A-5D.

At block 824, the apparatus causes termination of broadcast transmission of information indicative of the pseudorange correction based, at least in part, on the determination that the apparatus is in motion. The causation of termination of broadcast transmission of information indicative of the pseudorange correction may be similar as described regarding FIGS. 3A-3B, FIGS. 4A-4B, and FIGS. 5A-5D.

Figure 9:
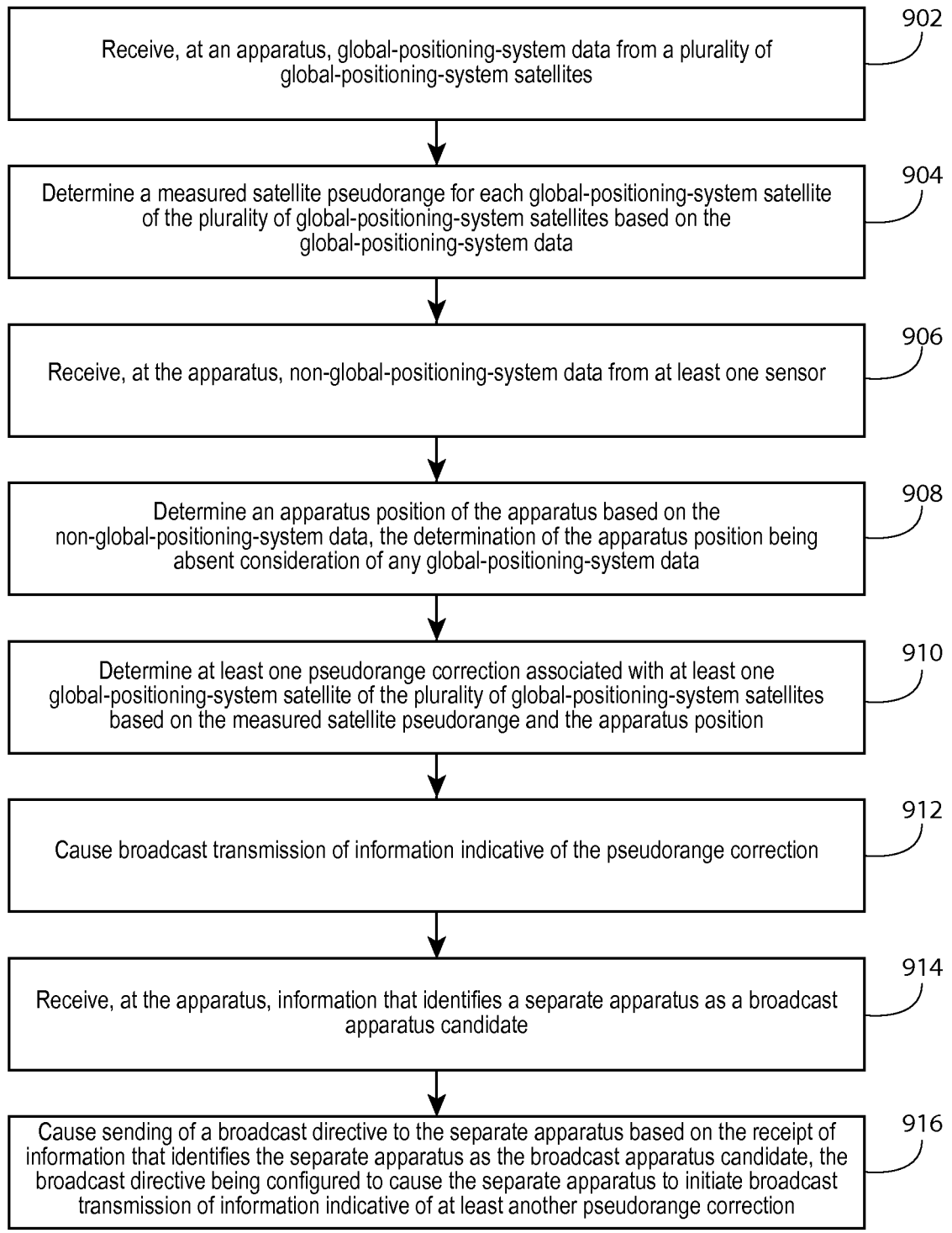
FIG. 9 is a flow diagram illustrating activities associated with causation of sending of a broadcast directive to a separate apparatus according to at least one example embodiment.

FIG. 9 is a flow diagram illustrating activities associated with causation of sending of a broadcast directive to a separate apparatus according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As described previously, in some circumstances, an apparatus may receive information that identifies a separate apparatus as a broadcast apparatus candidate and cause sending of a broadcast directive to the separate apparatus.

At block 902, the apparatus receives global-positioning-system data from a plurality of global-positioning-system satellites. The receipt, the apparatus, the global-positioning-system data, and the plurality of global-positioning-system satellites may be similar as described regarding FIGS. 2A-2B and FIGS. 3A-3B.

At block 904, the apparatus determines a measured satellite pseudorange for each global-positioning-system satellite of the plurality of global-positioning-system satellites based, at least in part, on the global-positioning-system data. The determination and the measured satellite pseudorange for each global-positioning-system satellite of the plurality of global-positioning-system satellites may be similar as described regarding FIGS. 3A-3B.

At block 906, the apparatus receives non-global-positioning-system data from at least one sensor. The receipt, the non-global-positioning-system data, and the at least one sensor may be similar as described regarding FIGS. 2A-2B, FIGS. 3A-3B, and FIGS. 4A-4B.

At block 908, the apparatus determines an apparatus position of the apparatus based, at least in part, on the non-global-positioning-system data. In at least one example embodiment, the determination of the apparatus position is absent consideration of any global-positioning-system data. The determination and the apparatus position may be similar as described regarding FIGS. 3A-3B, FIGS. 4A-4B, and FIGS. 5A-5D.

At block 910, the apparatus determines at least one pseudorange correction associated with at least one global-positioning-system satellite of the plurality of global-positioning-system satellites based, at least in part, on the measured satellite pseudorange and the apparatus position. The determination and the at least one pseudorange correction may be similar as described regarding FIGS. 3A-3B, FIGS. 4A-4B, and FIGS. 5A-5D.

At block 912, the apparatus causes broadcast transmission of information indicative of the pseudorange correction. In at least one example embodiment, the apparatus causes broadcast transmission of the pseudorange correction together with information indicative of the global-positioning-system satellite associated with the pseudorange correction. The causation of broadcast transmission of information indicative of the pseudorange correction may be similar as described regarding FIG. 2, FIGS. 3A-3B, FIGS. 4A-4B, and FIGS. 5A-5D.

At block 914, the apparatus receives information that identifies a separate apparatus as a broadcast apparatus candidate. The receipt, the separate apparatus, and the broadcast apparatus candidate may be similar as described regarding FIG. 2, FIGS. 3A-3B, FIGS. 4A-4B, and FIGS. 5A-5D.

At block 916, the apparatus causes sending of a broadcast directive to the separate apparatus based, at least in part, on the receipt of information that identifies the separate apparatus as the broadcast apparatus candidate. In at least one example embodiment, the broadcast directive is configured to cause the separate apparatus to initiate broadcast transmission of information indicative of at least another pseudorange correction. In at least one example embodiment, the other pseudorange correction is the pseudorange correction, a different pseudorange correction, and/or the like. The causation of sending, the broadcast directive, and the other pseudorange correction may be similar as described regarding FIG. 2, FIGS. 3A-3B, FIGS. 4A-4B, and FIGS. 5A-5D.

Figure 10:
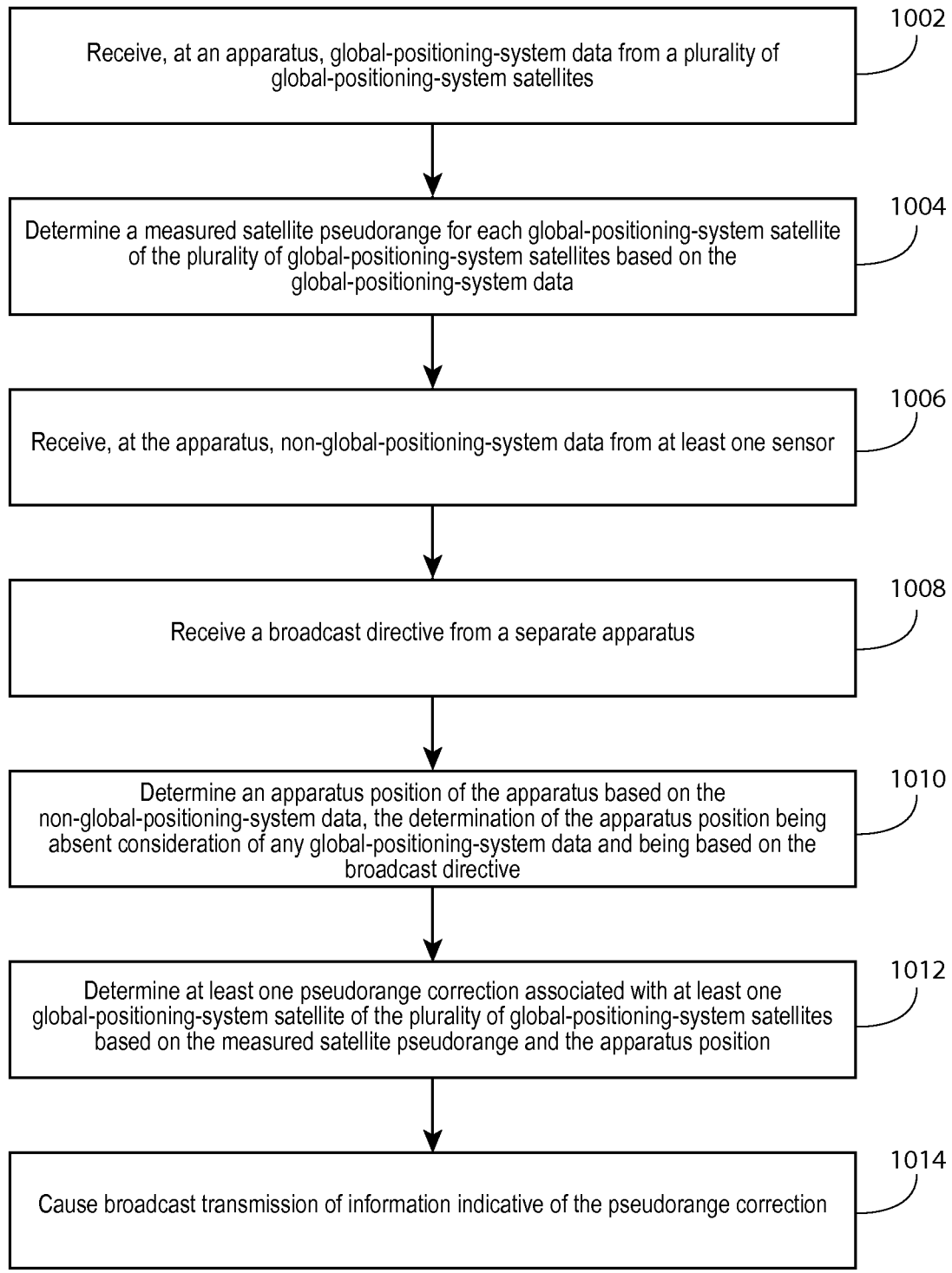
FIG. 10 is a flow diagram illustrating activities associated with causation of broadcast transmission of information indicative of a pseudorange correction according to at least one example embodiment.

FIG. 10 is a flow diagram illustrating activities associated with causation of broadcast transmission of information indicative of a pseudorange correction according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As described previously, in some circumstances, an apparatus may receive a broadcast directive from a separate apparatus. In such circumstances, the apparatus may determine the apparatus position of the apparatus, determine the pseudorange correction associated with the GPS satellite, cause broadcast transmission of information indicative of the pseudorange correction, and/or the like based, at least in part, on the receipt of the broadcast directive.

At block 1002, the apparatus receives global-positioning-system data from a plurality of global-positioning-system satellites. The receipt, the apparatus, the global-positioning-system data, and the plurality of global-positioning-system satellites may be similar as described regarding FIGS. 2A-2B and FIGS. 3A-3B.

At block 1004, the apparatus determines a measured satellite pseudorange for each global-positioning-system satellite of the plurality of global-positioning-system satellites based, at least in part, on the global-positioning-system data. The determination and the measured satellite pseudorange for each global-positioning-system satellite of the plurality of global-positioning-system satellites may be similar as described regarding FIGS. 3A-3B.

At block 1006, the apparatus receives non-global-positioning-system data from at least one sensor. The receipt, the non-global-positioning-system data, and the at least one sensor may be similar as described regarding FIGS. 2A-2B, FIGS. 3A-3B, and FIGS. 4A-4B.

At block 1008, the apparatus receives a broadcast directive from a separate apparatus. The receipt, the broadcast directive, and the separate apparatus may be similar as described regarding FIGS. 2A-2B, FIGS. 3A-3B, FIGS. 4A-4B, and FIGS. 5A-5D.

At block 1010, the apparatus determines an apparatus position of the apparatus based, at least in part, on the non-global-positioning-system data. In at least one example embodiment, the determination of the apparatus position is absent consideration of any global-positioning-system data. In at least one example embodiment, the determination of the apparatus position of the apparatus is based, at least in part, on the receipt of the broadcast directive from the separate apparatus. The determination and the apparatus position may be similar as described regarding FIGS. 3A-3B, FIGS. 4A-4B, and FIGS. 5A-5D.

At block 1012, the apparatus determines at least one pseudorange correction associated with at least one global-positioning-system satellite of the plurality of global-positioning-system satellites based, at least in part, on the measured satellite pseudorange and the apparatus position. The determination and the at least one pseudorange correction may be similar as described regarding FIGS. 3A-3B, FIGS. 4A-4B, and FIGS. 5A-5D.

At block 1014, the apparatus causes broadcast transmission of information indicative of the pseudorange correction. In at least one example embodiment, the apparatus causes broadcast transmission of the pseudorange correction together with information indicative of the global-positioning-system satellite associated with the pseudorange correction. The causation of broadcast transmission of information indicative of the pseudorange correction may be similar as described regarding FIG. 2, FIGS. 3A-3B, FIGS. 4A-4B, and FIGS. 5A-5D.

Figure 11:
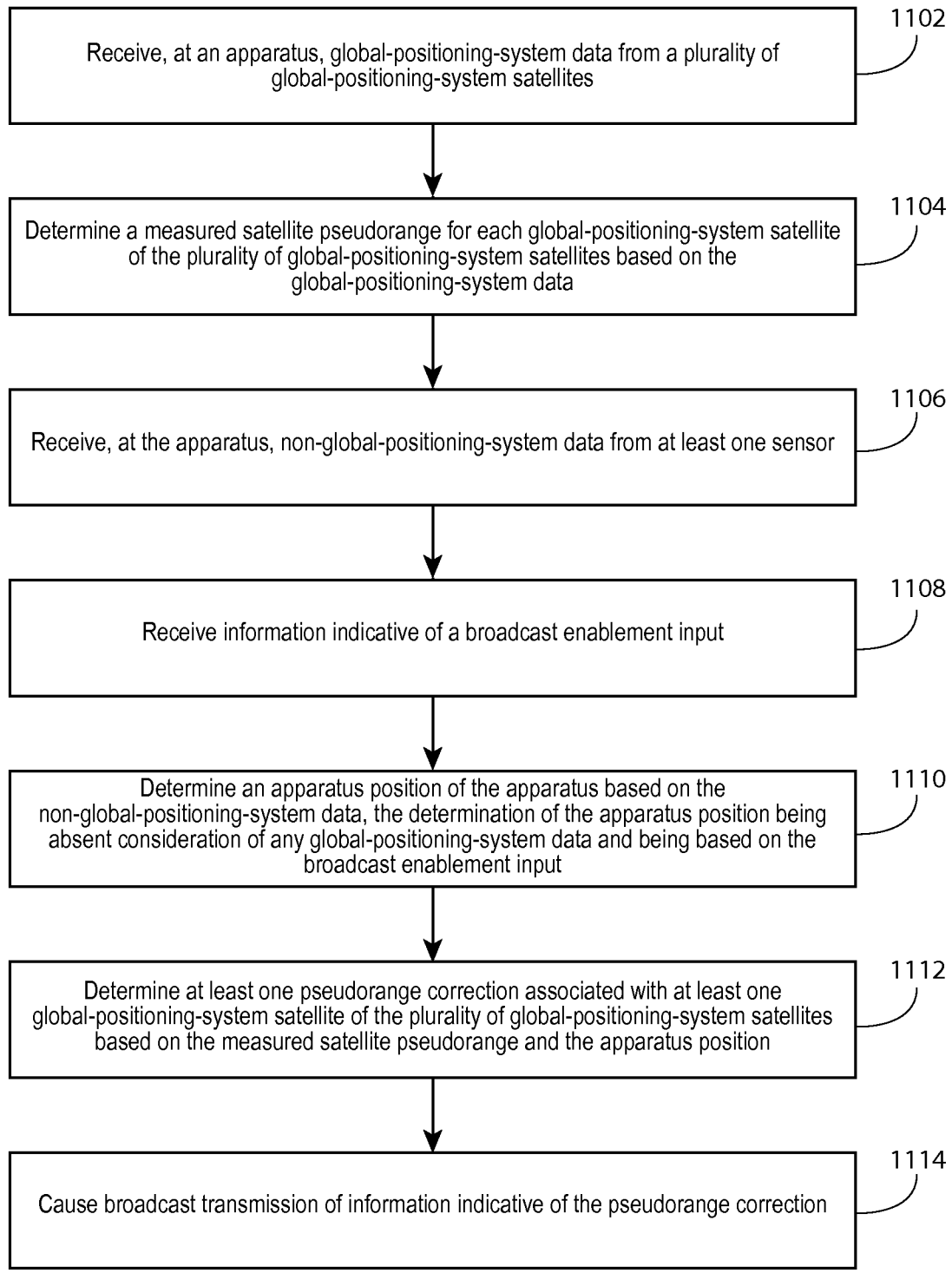
FIG. 11 is a flow diagram illustrating activities associated with causation of broadcast transmission of information indicative of a pseudorange correction according to at least one example embodiment.

FIG. 11 is a flow diagram illustrating activities associated with causation of broadcast transmission of information indicative of a pseudorange correction according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

As described previously, in some circumstances, an apparatus may receive information indicative of a broadcast enablement input. In such circumstances, the apparatus may determine the apparatus position of the apparatus, determine the pseudorange correction associated with the GPS satellite, cause broadcast transmission of information indicative of the pseudorange correction, and/or the like based, at least in part, on the broadcast enablement input.

At block 1102, the apparatus receives global-positioning-system data from a plurality of global-positioning-system satellites. The receipt, the apparatus, the global-positioning-system data, and the plurality of global-positioning-system satellites may be similar as described regarding FIGS. 2A-2B and FIGS. 3A-3B.

At block 1104, the apparatus determines a measured satellite pseudorange for each global-positioning-system satellite of the plurality of global-positioning-system satellites based, at least in part, on the global-positioning-system data. The determination and the measured satellite pseudorange for each global-positioning-system satellite of the plurality of global-positioning-system satellites may be similar as described regarding FIGS. 3A-3B.

At block 1106, the apparatus receives non-global-positioning-system data from at least one sensor. The receipt, the non-global-positioning-system data, and the at least one sensor may be similar as described regarding FIGS. 2A-2B, FIGS. 3A-3B, and FIGS. 4A-4B.

At block 1108, the apparatus receives information indicative of a broadcast enablement input. The receipt and the broadcast enablement directive may be similar as described regarding FIGS. 2A-2B, FIGS. 3A-3B, FIGS. 4A-4B, and FIGS. 5A-5D.

At block 1110, the apparatus determines an apparatus position of the apparatus based, at least in part, on the non-global-positioning-system data. In at least one example embodiment, the determination of the apparatus position is absent consideration of any global-positioning-system data. In at least one example embodiment, the determination of the apparatus position of the apparatus is based, at least in part, on the receipt of the information indicative of the broadcast enablement input. The determination and the apparatus position may be similar as described regarding FIGS. 3A-3B, FIGS. 4A-4B, and FIGS. 5A-5D.

At block 1112, the apparatus determines at least one pseudorange correction associated with at least one global-positioning-system satellite of the plurality of global-positioning-system satellites based, at least in part, on the measured satellite pseudorange and the apparatus position. The determination and the at least one pseudorange correction may be similar as described regarding FIGS. 3A-3B, FIGS. 4A-4B, and FIGS. 5A-5D.

At block 1114, the apparatus causes broadcast transmission of information indicative of the pseudorange correction. In at least one example embodiment, the apparatus causes broadcast transmission of the pseudorange correction together with information indicative of the global-positioning-system satellite associated with the pseudorange correction. The causation of broadcast transmission of information indicative of the pseudorange correction may be similar as described regarding FIG. 2, FIGS. 3A-3B, FIGS. 4A-4B, and FIGS. 5A-5D.

Figure 12:
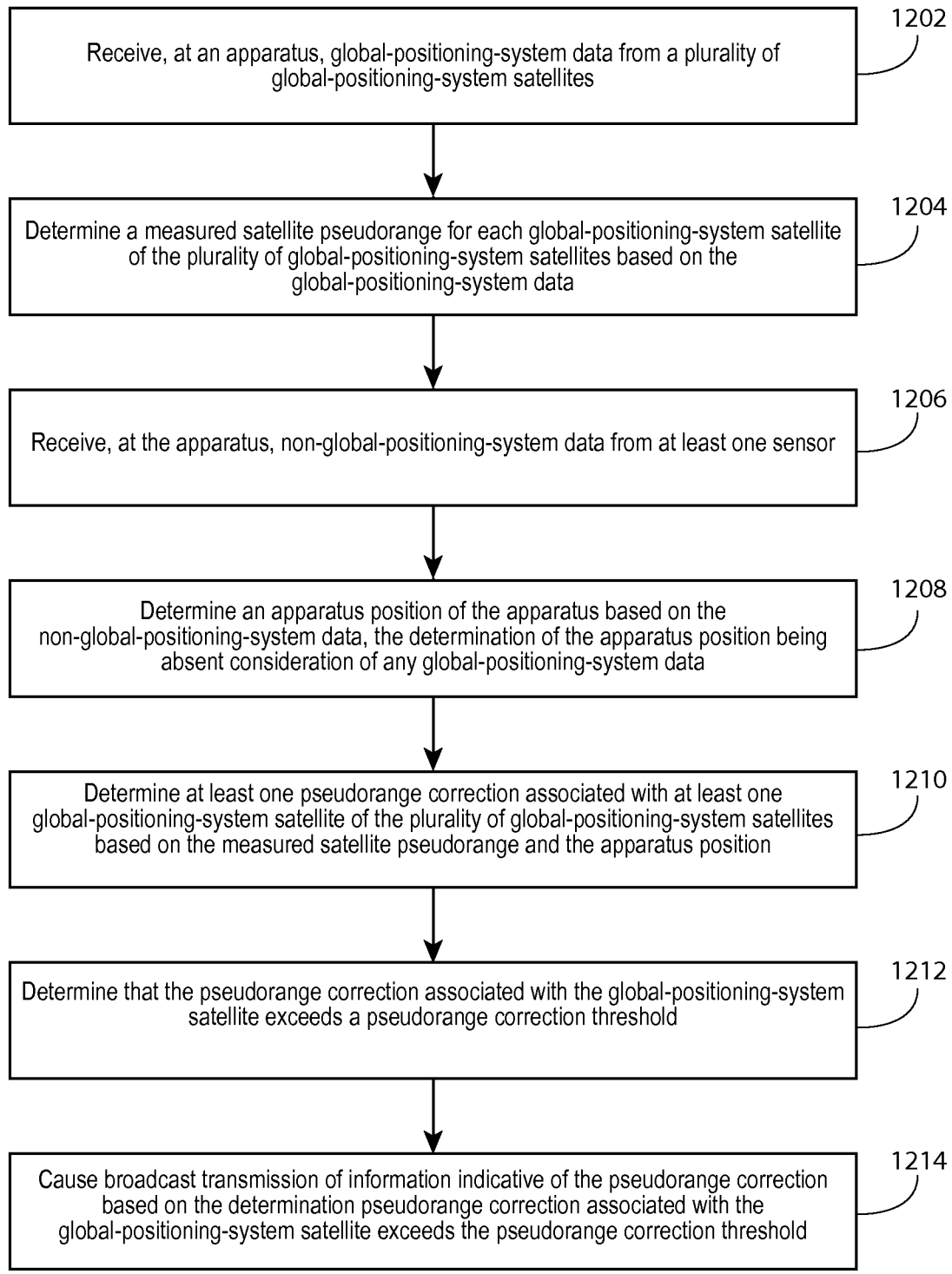
FIG. 12 is a flow diagram illustrating activities associated with causation of broadcast transmission of information indicative of a pseudorange correction according to at least one example embodiment.

FIG. 12 is a flow diagram illustrating activities associated with causation of broadcast transmission of information indicative of a pseudorange correction according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

As described previously, in some circumstances, an apparatus may cause broadcast transmission of information indicative of the pseudorange correction based, at least in part, on a determination that the pseudorange correction associated with at least one global-positioning-system satellite exceeds a pseudorange correction threshold.

At block 1202, the apparatus receives global-positioning-system data from a plurality of global-positioning-system satellites. The receipt, the apparatus, the global-positioning-system data, and the plurality of global-positioning-system satellites may be similar as described regarding FIGS. 2A-2B and FIGS. 3A-3B.

At block 1204, the apparatus determines a measured satellite pseudorange for each global-positioning-system satellite of the plurality of global-positioning-system satellites based, at least in part, on the global-positioning-system data. The determination and the measured satellite pseudorange for each global-positioning-system satellite of the plurality of global-positioning-system satellites may be similar as described regarding FIGS. 3A-3B.

At block 1206, the apparatus receives non-global-positioning-system data from at least one sensor. The receipt, the non-global-positioning-system data, and the at least one sensor may be similar as described regarding FIGS. 2A-2B, FIGS. 3A-3B, and FIGS. 4A-4B.

At block 1208, the apparatus determines an apparatus position of the apparatus based, at least in part, on the non-global-positioning-system data. In at least one example embodiment, the determination of the apparatus position is absent consideration of any global-positioning-system data. The determination and the apparatus position may be similar as described regarding FIGS. 3A-3B, FIGS. 4A-4B, and FIGS. 5A-5D.

At block 1210, the apparatus determines at least one pseudorange correction associated with at least one global-positioning-system satellite of the plurality of global-positioning-system satellites based, at least in part, on the measured satellite pseudorange and the apparatus position. The determination and the at least one pseudorange correction may be similar as described regarding FIGS. 3A-3B, FIGS. 4A-4B, and FIGS. 5A-5D.

At block 1212, the apparatus determines that the pseudorange correction associated with at least one global-positioning-system satellite exceeds a pseudorange correction threshold. The determination and the pseudorange correction threshold may be similar as described regarding FIGS. 3A-3B, FIGS. 4A-4B, and FIGS. 5A-5D.

At block 1214, the apparatus causes broadcast transmission of information indicative of the pseudorange correction. In at least one example embodiment, the apparatus causes broadcast transmission of the pseudorange correction together with information indicative of the global-positioning-system satellite associated with the pseudorange correction. In at least one example embodiment, the causation of broadcast transmission of the information indicative of the pseudorange is based, at least in part, on the determination that the pseudorange correction associated with at least one global-positioning-system satellite exceeds the pseudorange correction threshold. The causation of broadcast transmission of information indicative of the pseudorange correction may be similar as described regarding FIG. 2, FIGS. 3A-3B, FIGS. 4A-4B, and FIGS. 5A-5D.

One or more example embodiments may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 1008 of FIG. 10 may be performed after block 1010 of FIG. 10, may be performed before block 1006 of FIG. 10, and/or the like. In another example, blocks 602 and 604 may be performed after block 608 of FIG. 6. Furthermore, if desired, one or more of the above-described functions may be optional or may be combined. For example, block 608 of FIG. 6 may be optional and/or combined with block 606 of FIG. 6.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. An apparatus, comprising:
at least one processor;
at least one memory including computer program code, the memory and the computer program code configured to, working with the processor, cause the apparatus to perform at least the following:
receipt, by the apparatus, of global-positioning-system data from a plurality of global-positioning-system satellites;
determination of a measured satellite pseudorange for each global-positioning-system satellite of the plurality of global-positioning-system satellites based, at least in part, on the global-positioning-system data;
receipt, by the apparatus, of parking sensor data from at least one parking sensor;
determination of an apparatus position of the apparatus based, at least in part, on the parking sensor data, the determination of the apparatus position being absent consideration of any global-positioning-system data;
determination of at least one pseudorange correction associated with at least one global-positioning-system satellite of the plurality of global-positioning-system satellites based, at least in part, on the measured satellite pseudorange and the apparatus position determined from the parking sensor data;
determination that the pseudorange correction associated with the global-positioning-system satellite exceeds a pseudorange correction threshold; and
causation of broadcast transmission of information indicative of the pseudorange correction to a separate apparatus for correction using the pseudorange correction based on the apparatus position from the parking sensor data, wherein the causation of broadcast transmission of information indicative of the pseudorange correction is predicated by the determination that the pseudorange correction associated with the global-positioning-system satellite exceeds the pseudorange correction threshold.

2. The apparatus of claim 1, wherein the memory includes computer program code configured to, working with the processor, cause the apparatus to perform:
determination of an actual pseudorange for each global-positioning-system satellite of the plurality of global-positioning-system satellites based, at least in part, on the apparatus position, wherein the determination of the pseudorange correction is based, at least in part, on a difference between the measured satellite pseudorange and the actual pseudorange.

3. The apparatus of claim 1, wherein the memory includes computer program code configured to, working with the processor, cause the apparatus to perform:
receipt, by the apparatus, of different global-positioning-system data from the plurality of global-positioning-system satellites;
determination of a different measured satellite pseudorange for each global-positioning-system satellite of the plurality of global-positioning-system satellites based, at least in part, on the different global-positioning-system data;
receipt, by the apparatus, of different non-global-positioning-system data from at least one sensor; and
determination of a different apparatus position of the apparatus based, at least in part, on the different non-global-positioning-system data, the determination of the different apparatus position being absent consideration of any global-positioning-system data.

4. The apparatus of claim 3, wherein the memory includes computer program code configured to, working with the processor, cause the apparatus to perform:
determination of at least one different pseudorange correction associated with at least one global-positioning-system satellite of the plurality of global-positioning-system satellites based, at least in part, on the different measured satellite pseudorange and the different apparatus position; and
causation of broadcast transmission of information indicative of the different pseudorange correction.

5. The apparatus of claim 3, wherein the memory includes computer program code configured to, working with the processor, cause the apparatus to perform:
determination that the apparatus is in motion based, at least in part, on the apparatus position and the different apparatus position; and
causation of termination of broadcast transmission of information indicative of the pseudorange correction based, at least in part, on the determination that the apparatus is in motion.

6. The apparatus of claim 1, wherein the memory includes computer program code configured to, working with the processor, cause the apparatus to perform:

receipt of information that identifies a separate apparatus as a broadcast apparatus candidate;

determination that at least one broadcast hand-off condition has been satisfied; and causation of sending of a broadcast directive to the separate apparatus, the broadcast directive being configured to cause the separate apparatus to initiate broadcast transmission of information indicative of at least another pseudorange correction, the causation of sending of the broadcast directive to the separate apparatus being based, at least in part, on the determination that the broadcast hand-off condition has been satisfied.

7. The apparatus of claim 6, wherein the memory includes computer program code configured to, working with the processor, cause the apparatus to perform:

receipt of information that identifies another separate apparatus as another broadcast apparatus candidate; and determination that the separate apparatus is more favorable for causation of initiation of broadcast transmission of information indicative of the other pseudorange correction than the other separate apparatus, wherein the causation of sending of the broadcast directive to the separate apparatus is based, at least in part, on the determination that the separate apparatus is more favorable for causation of initiation of broadcast transmission of information indicative of the other pseudorange correction than the other separate apparatus.

8. A method comprising:

receiving, by an apparatus, global-positioning-system data from a plurality of global-positioning-system satellites;

determining a measured satellite pseudorange for each global-positioning-system satellite of the plurality of global-positioning-system satellites based, at least in part, on the global-positioning-system data;

receiving, by the apparatus, parking sensor data from at least one parking sensor;

determining an apparatus position of the apparatus based, at least in part, on the parking sensor data, the determination of the apparatus position being absent consideration of any global-positioning-system data;

determining at least one pseudorange correction associated with at least one global-positioning-system satellite of the plurality of global-positioning-system satellites based, at least in part, on the measured satellite pseudorange and the apparatus position;

determining that the pseudorange correction associated with the global-positioning-system satellite exceeds a pseudorange correction threshold; and causing broadcast transmission of information indicative of the pseudorange correction, wherein the causing of broadcast transmission of information indicative of the pseudorange correction is predicated by the determination that the pseudorange correction associated with the global-positioning-system satellite exceeds the pseudorange correction threshold.

9. The method of claim 8, further comprising:

determining an actual pseudorange for each global-positioning-system satellite of the plurality of global-positioning-system satellites based, at least in part, on the apparatus position, wherein the determination of the pseudorange correction is based, at least in part, on a difference between the measured satellite pseudorange and the actual pseudorange.

10. The method of claim 8, further comprising:

receiving, by the apparatus, different global-positioning-system data from the plurality of global-positioning-system satellites;

determining a different measured satellite pseudorange for each global-positioning-system satellite of the plurality of global-positioning-system satellites based, at least in part, on the different global-positioning-system data;

receiving, by the apparatus, different non-global-positioning-system data from at least one sensor; and determining a different apparatus position of the apparatus based, at least in part, on the different non-global-positioning-system data, the determination of the different apparatus position being absent consideration of any global-positioning-system data.

11. The method of claim 10, further comprising:

determining at least one different pseudorange correction associated with at least one global-positioning-system satellite of the plurality of global-positioning-system satellites based, at least in part, on the different measured satellite pseudorange and the different apparatus position; and causing broadcast transmission of information indicative of the different pseudorange correction.

12. The method of claim 8, further comprising:

receiving information that identifies a separate apparatus as a broadcast apparatus candidate;

determining that at least one broadcast hand-off condition has been satisfied; and causing sending of a broadcast directive to the separate apparatus, the broadcast directive being configured to cause the separate apparatus to initiate broadcast transmission of information indicative of at least another pseudorange correction, the causing of sending of the broadcast directive to the separate apparatus being based, at least in part, on the determination that the broadcast hand-off condition has been satisfied.

13. The method of claim 12, further comprising:

receiving information that identifies another separate apparatus as another broadcast apparatus candidate; and determining that the separate apparatus is more favorable for causation of initiation of broadcast transmission of information indicative of the other pseudorange correction than the other separate apparatus, wherein the causation of sending of the broadcast directive to the separate apparatus is based, at least in part, on the determination that the separate apparatus is more favorable for causation of initiation of broadcast transmission of information indicative of the other pseudorange correction than the other separate apparatus.

14. A method comprising:

receiving, by an apparatus, global-positioning-system data from a plurality of global-positioning-system satellites;

determining a measured satellite pseudorange for each global-positioning-system satellite of the plurality of global-positioning-system satellites based, at least in part, on the global-positioning-system data;

receiving, by the apparatus, parking sensor data from at least one parking sensor;

determining an apparatus position of the apparatus based, at least in part, on the parking sensor data, the determination of the apparatus position being absent consideration of any global-positioning-system data;

determining at least one pseudorange correction associated with at least one global-positioning-system satellite of the plurality of global-positioning-system satellites based, at least in part, on the measured satellite pseudorange and the apparatus position;

causing broadcast transmission of information indicative of the pseudorange correction;

receiving, by the apparatus, different global-positioning-system data from the plurality of global-positioning-system satellites;

determining a different measured satellite pseudorange for each global-positioning-system satellite of the plurality of global-positioning-system satellites based, at least in part, on the different global-positioning-system data;

receiving, by the apparatus, different non-global-positioning-system data from at least one sensor;

determining a different apparatus position of the apparatus based, at least in part, on the different non-global-positioning-system data, the determination of the different apparatus position being absent consideration of any global-positioning-system data;

determining that the apparatus is in motion based, at least in part, on the apparatus position and the different apparatus position; and causing termination of broadcast transmission of information indicative of the pseudorange correction based, at least in part, on the determination that the apparatus is in motion.

* * * * *